US012142399B2

(12) United States Patent
Huang et al.

(10) Patent No.: US 12,142,399 B2
(45) **Date of Patent: *Nov. 12, 2024**

(54) COMPOSITE CONDUCTORS INCLUDING RADIATIVE AND/OR HARD COATINGS AND METHODS OF MANUFACTURE THEREOF

(71) Applicant: TS Conductor Corp., Huntington Beach, CA (US)

(72) Inventors: Jianzhong Jason Huang, San Clemente, CA (US); Rulong Chen, San Clemente, CA (US); Jianping Huang, Markham (CA); Vivek Kohli, Navi Mumbai (IN)

(73) Assignee: TS Conductor Corp., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,638

(22) Filed: Nov. 10, 2023

(65) Prior Publication Data

US 2024/0290519 A1 Aug. 29, 2024

Related U.S. Application Data

(63) Continuation of application No. 18/189,726, filed on Mar. 24, 2023, now Pat. No. 11,854,721.

(Continued)

(51) Int. Cl.
*H01B 7/28* (2006.01)
*H01B 3/00* (2006.01)

(Continued)

(52) U.S. Cl.
CPC ............... *H01B 7/28* (2013.01); *H01B 3/002* (2013.01); *H01B 7/0225* (2013.01); *H01B 7/1875* (2013.01)

(58) Field of Classification Search
CPC .... H01B 3/002; H01B 7/1875; H01B 7/0225; H01B 7/28
See application file for complete search history.

(56) References Cited

U.S. PATENT DOCUMENTS 1,794,269 A 2/1931 Johann
3,378,631 A 4/1968 Thomas
(Continued)

FOREIGN PATENT DOCUMENTS

CN 105788738 A 7/2016
EP 1135879 A1 9/2001
(Continued)

OTHER PUBLICATIONS

Chen Y., et al., "Beyond 85° C: Thermal Aging Impact on Optical Fiber with Corning® CPC® Coatings", Jun. 1, 2017 (Jun. 1, 2017), pp. 1-12, Retrieved from the Internet: URL:https://www.corning.com/media/worldwide/coc/documents/Fiber/white-paper/WP4250.pdf [retrieved on Feb. 7, 2024], XP093128604.

(Continued)

*Primary Examiner* — Hoa C Nguyen
*Assistant Examiner* — Amol H Patel
(74) *Attorney, Agent, or Firm* — COOLEY LLP

(57) ABSTRACT

An apparatus includes a strength member including a core formed of a composite material, and an encapsulation layer disposed around the core. A conductor layer is disposed around the strength member. A coating is disposed on the conductor layer. The coating is formulated to have a solar absorptivity of less than 0.5 at a wavelength of less than 2.5 microns, and a radiative emissivity of greater than 0.5 at a wavelength in a range of 2.5 microns to 15 microns, at an operating temperature in a range of 60 degrees Celsius to 250 degrees Celsius. The coating may have an erosion (Continued)

resistance that is at least 5% greater than an erosion resistance of aluminum or aluminum alloys.

27 Claims, 5 Drawing Sheets

Related U.S. Application Data

(60) Provisional application No. 63/353,390, filed on Jun. 17, 2022, provisional application No. 63/324,468, filed on Mar. 28, 2022.

(51) Int. Cl.
*H01B 7/02* (2006.01)
*H01B 7/18* (2006.01)

(56) References Cited

U.S. PATENT DOCUMENTS

| | | | |
|---|---|---|---|
| 3,674,915 | A | 7/1972 | Pritchard |
| 3,749,813 | A | 7/1973 | Shealy |
| 3,813,481 | A | 5/1974 | Adams |
| 3,813,772 | A | 6/1974 | Adams |
| 4,020,277 | A | 4/1977 | La Chance, Sr et al. |
| 4,149,367 | A | 4/1979 | Eistrat |
| 4,436,954 | A | 3/1984 | Kaderjak et al. |
| 5,243,137 | A | 9/1993 | Gentry |
| 5,808,238 | A | 9/1998 | Munakata et al. |
| 6,147,303 | A | 11/2000 | Abe et al. |
| 6,241,920 | B1 | 6/2001 | Cotter et al. |
| 7,015,395 | B2 | 3/2006 | Goldsworthy et al. |
| 7,179,522 | B2 | 2/2007 | Hiel et al. |
| 7,188,406 | B2 | 3/2007 | Varkey et al. |
| 7,622,681 | B2 | 11/2009 | Kikuchi et al. |
| 9,328,245 | B2 | 5/2016 | Siripurapu et al. |
| 9,595,368 | B2 | 3/2017 | Ranganathan et al. |
| 9,633,766 | B2 | 4/2017 | Huang |
| 9,741,467 | B2 | 8/2017 | Ranganathan et al. |
| 9,859,038 | B2 | 1/2018 | Davis et al. |
| 9,923,111 | B2 | 3/2018 | Fan et al. |
| 10,088,251 | B2 | 10/2018 | Raman et al. |
| 10,304,586 | B2 | 5/2019 | Huang |
| 10,332,658 | B2 | 6/2019 | Mhetar et al. |
| 10,586,633 | B2 | 3/2020 | Davis et al. |
| 10,726,975 | B2 | 7/2020 | Ranganathan et al. |
| 10,886,036 | B2 | 1/2021 | Huang |
| 10,941,990 | B2 | 3/2021 | Raman et al. |
| 11,854,721 | B2 | 12/2023 | Huang et al. |
| 2004/0026112 | A1 | 2/2004 | Goldsworthy et al. |
| 2008/0233380 | A1 | 9/2008 | Hiel et al. |
| 2011/0204297 | A1 | 8/2011 | Park et al. |
| 2015/0104641 | A1 | 4/2015 | Mhetar et al. |
| 2015/0194240 | A1* | 7/2015 | Ranganathan ......... H01B 7/292 427/117 |
| 2015/0353737 | A1 | 12/2015 | Siripurapu et al. |
| 2016/0099090 | A1 | 4/2016 | Huang |
| 2016/0181771 | A1 | 6/2016 | Kwon |
| 2017/0137659 | A1 | 5/2017 | Ranganathan et al. |
| 2017/0178764 | A1 | 6/2017 | Huang |
| 2017/0314878 | A1 | 11/2017 | Raman et al. |
| 2018/0025809 | A1 | 1/2018 | Ranganathan et al. |
| 2018/0156848 | A1 | 6/2018 | Ospina Ramirez et al. |
| 2018/0211746 | A1* | 7/2018 | Ranganathan ........... H01B 1/08 |
| 2018/0361879 | A1 | 12/2018 | Bosze et al. |
| 2019/0295739 | A1 | 9/2019 | Huang |
| 2020/0208854 | A1 | 7/2020 | Johnson et al. |
| 2020/0333047 | A1 | 10/2020 | Raman et al. |
| 2021/0048469 | A1 | 2/2021 | Dong et al. |
| 2021/0219463 | A1 | 7/2021 | Raman et al. |
| 2021/0246320 | A1* | 8/2021 | Coogan .............. C09D 101/284 |
| 2022/0184733 | A1 | 6/2022 | Mori |
| 2022/0221676 | A1 | 7/2022 | Maida et al. |
| 2022/0385055 | A1 | 12/2022 | Dong et al. |
| 2023/0307155 | A1 | 9/2023 | Huang et al. |
| 2024/0079861 | A1 | 3/2024 | Huang et al. |
| 2024/0136088 | A1 | 4/2024 | Huang et al. |

FOREIGN PATENT DOCUMENTS

| | | | |
|---|---|---|---|
| EP | 3178095 | A1 | 6/2017 |
| WO | WO-02098996 | A1 | 12/2002 |
| WO | WO-2007034248 | A1 | 3/2007 |
| WO | WO-2014/025420 | A1 | 2/2014 |
| WO | WO-2015105972 | A1 | 7/2015 |
| WO | WO-2016046790 | A1 | 3/2016 |
| WO | WO-2021225986 | A1 | 11/2021 |
| WO | WO-2021225989 | A1 | 11/2021 |
| WO | WO-2021225990 | A1 | 11/2021 |
| WO | WO-2021225992 | A1 | 11/2021 |
| WO | WO-2021225995 | A1 | 11/2021 |
| WO | WO-2023192807 | A1 | 10/2023 |
| WO | WO-2023212610 | A1 | 11/2023 |
| WO | WO-2024091951 | | 5/2024 |

OTHER PUBLICATIONS

International Search Report and Written Opinion of the International Searching Authority for International Application No. PCT/US2023/077651, dated Apr. 11, 2024, 26 pages.

Invitation to pay additional fees for International Application No. PCT/US2023/077651 dated Feb. 21, 2024, 22 pages.

Wikipedia., "Optical ground wire", Feb. 25, 2022 (Feb. 25, 2022), pp. 1-2, Retrieved from the Internet: URL: https://en.wikipedia.org/w/index.php?title=Optical_ground_wire&oldid=1072089888[retrieved on Jan. 30, 2024], XP093125543.

Atiganyanun, "Use of hollow silica and titanium dioxide microparticles in solar reflective paints for daytime radiative cooling applications in a tropical region," Journal of Photonics for Energy, vol. 11(2), Apr.-Jun. 2021, 14 pages.

[Author Unknown] "Application Note, Microbending & Macrobending Power Losses in Optical Fibers". AFL Hyperscale, white paper, [date unknown], 4 pages.

[Author Unknown] "Hendrix Covered Conductor Manual". Western Power, ABN 18540492861, Rev Aug. 2 - 8, 2013, DM#: 5523521,56 pages.

[Author Unknown] "Messenger Wire—Spacer Cable Systems". Hendrix Aerial Cable Systems, Marmon Utility LLC, [date unknown], 1 page.

Bosta et al., "Influence of electrolyte temperature on properties and infrared emissivity of MAO ceramic coating on 6061 aluminum alloy," Infrared Physics & Technology, vol. 67, 2014, pp. 63-72.

Chen et al., "Passive daytime radiative cooling: Fundamentals, material designs, and applications," EcoMat, vol. 4:e12153, 2022, 28 pages.

Glisic, et al., "Piles monitoring during the axial compression, pullout and flexure test using fiber optic sensors". Transportation Research Board (TRB), Record 1808, Paper No. 02-2701 (2002); 1808(1): 11-20.

Gunday, et al., "Optical fiber distributed sensing of temperature, thermal strain and thermo-mechanical force formations on OPGW cables under wind effects". 2013 8th International Conference on Electrical and Electronics Engineering (ELECO), Bursa, Turkey, 2013, pp. 462-467, 7 pages.

Huang et al., "Scalable Aqueous Processing-Based Passive Daytime Radiative Cooling Coatings," Advanced Functional Materials, vol. 31, 2021, 7 pages.

Inaudi, et al., "Overview of Fibre Optic Sensing Applications to Structural Health Monitoring", 13th FIG Symposium on Deformation Measurement and Analysis, 4th IAG Symposium on Geodesy for Geotechnical and Structural Engineering, LNEC, Lisbon May 12-15, 2008, Smartec SA, Switzerland, 10 pages.

International Search Report and Written Opinion for International Application No. PCT/US2023/064922 dated Jun. 28, 2023, 13 pages.

International Search Report and Written Opinion for PCT Application No. PCT/US2023/066257 dated Aug. 10, 2023, 14 pages.

(56) References Cited

OTHER PUBLICATIONS

Jay, John A., "An overview of Macro-bending and Micro-bending of optical fiber", Corning Incorporated, Dec. 2010, WP1212, 21 pages.
Mandal et al., "Hierarchically porous polymer coatings for highly efficient passive daytime radiative cooling," Science, vol. 362, 2018, pp. 315-319.
Mandal et al., "Paints as a Scalable and Effective Radiative Cooling Technology for Buildings," Joule, vol. 4, Jul. 15, 2020, pp. 1350-1356.
Non Final Office Action for U.S. Appl. No. 18/189,726 dated Jul. 10, 2023, 10 pages.
Trager, Brian J., "Medium Voltage Line Design—A Covered Conductor Alternative for Long Spans and River Crossings". Hendrix Overhead Systems, Marmon Utility LLC, [date unknown], 10 pages.
Ukil, et al., "Distributed Temperature Sensing: Review of Technology and Applications". IEEE Sensors Journal, vol. 12, Issue: 5, May 2012, pp. 885-892, arXiv: 1503.06261v1 [physics, ins-det].
Yang et al., "Optical emission spectroscopy of plasma electrolytic oxidation process on 7075 aluminum alloy," Surface & Coatings Technology, vol. 324, May 3, 2017, pp. 18-25.
Yang et al., "Passive daytime radiative cooling: Principle, application, and economic analysis," MRS Energy & Sustainability: A Review Journal, vol. 7, e18, 2020, 8 pages.
Dexmat, "Galvorn 199 Filament CNT Fiber Tow," Product Sheet, Sep. 2022, 1 page.
Dexmat, "Galvorn 37 Filament CNT Fiber Tow," Product Sheet, Sep. 2022, 1 page.
Hyosung Corporation, "Hyosung carbon fiber products are high strength (H2550, 12k/24k) and intermediate modulus. (H3055, 12k)," Product Sheet, Nov. 2012, 1 page.
Invitation to pay additional fees for International Application No. PCT/US2024/023743 dated Jul. 29, 2024, 10 pages.

* cited by examiner

COMPOSITE CONDUCTORS INCLUDING RADIATIVE AND/OR HARD COATINGS AND METHODS OF MANUFACTURE THEREOF

CROSS-REFERENCE TO RELATED APPLICATIONS

This application is a continuation of U.S. patent application Ser. No. 18/189,726, filed Mar. 24, 2023, and entitled "Composite Conductors Including Radiative and/or Hard Coatings and Methods of Manufacture Thereof." which claims priority to and benefit of U.S. Provisional Application No. 63/324,468, filed Mar. 28, 2022, and entitled "Composite Conductors Including Radiative Coatings and Methods of Manufacture Thereof," and U.S. Provisional Application No. 63/353,390, filed Jun. 17, 2022, and entitled "Composite Conductors Including Radiative and/or Hard Coatings and Methods of Manufacture Thereof," the entire disclosures of which are incorporated herein by reference.

TECHNICAL FIELD

The embodiments described herein relate generally to conductors for use in grid transmission and distribution applications.

BACKGROUND

The electrical grid is a major contributor to greenhouse emissions and global warming. The US electrical grid is more than 25 years old and globally about 2,000 TWh electricity is wasted annually, and about 1 Billion Metric Ton of GHG emission is associated with just compensatory generation. As the demand for electricity grows, there is an increased demand for higher capacity electricity transmission and distribution lines. The amount of power delivered by an electrical conductor is dependent on the current-carrying capacity (also referred to as the ampacity) of the conductor transmitting the electric current. The current carrying capacity of such conductors is however, limited by the operating temperature of the conductor, and line sag. Too high of a temperature can not only increase line sag, but also damage the conductor or other components of the transmission system. The inherent resistance of the conductor causes heat to be generated by the conductor, further increasing the operating temperature of the conductor. Moreover, since conductors are generally formed of metallic materials, conductors used for grid transmission and distribution are good absorbers of solar radiation. Absorption of solar radiation also increases the operating temperature of such conductors, thus further increasing the operating temperature of the conductor and decreasing the current carrying capacity of electrical conductors. Additionally, many conductors are formed from aluminum or other soft materials that are susceptible to cutting or erosion, leading to accidents and loss of service.

SUMMARY

Embodiments described herein relate generally to systems and methods for electrical transmission using coated conductors and, in particular, to electrical conductors that include a strength member, including a composite core and an encapsulation layer disposed around the composite core, and a conductor layer(s) that may include a plurality of strands of a conductive material disposed around the strength member. A coating having low solar absorptivity and high radiative emissivity is disposed around at least the conductor surface layer to reduce solar absorption and/or increase radiative emissivity of the conductor, thus reducing operating temperature of the conductor for transmitting a particular current or increasing the ampacity of the conductor at a particular operating temperature relative to a non-coated conductor. The reduced operating temperature also reduces the conductor resistance and associated line loss in PowerGrid. The coating may additionally, have high erosion resistance to prevent unintentional cutting of the conductor layer, for example, from shearing by kite strings. Moreover, the encapsulation layer may additionally or alternatively be configured to have high reflectivity, and/or an outer surface of the conductor layer may be configured to have low reflectivity. Embodiments described herein are also applicable to electrical distribution at low voltages, such as, for example, at operating voltages of 69 kV or below. The coatings described herein may be configured to include any combination of the properties and/or functionalities described herein including, but not limited to reduced solar absorptivity, increased radiative emissivity, and/or improved erosion resistance or corrosion resistance of the conductor.

In some embodiments, an apparatus includes a strength member including a core formed of a composite material, and an encapsulation layer disposed around the core. A conductor layer is disposed around the strength member. A coating is disposed on the conductor layer. The coating is formulated to have an absorptivity of less than 0.5 at a wavelength of less than 2.5 microns, and a radiative emissivity of greater than 0.5 at a wavelength in a range of 2.5 microns to 15 microns, at an operating temperature in a range of 60 degrees Celsius to 250 degrees Celsius.

In some embodiments, an apparatus includes a strength member including a core formed of a composite material, and an encapsulation layer disposed around the core. An outer surface of the encapsulation layer is configured to have a reflectivity of greater than 50% at thermal radiative wavelengths corresponding to an operating temperature of greater than 90 degrees Celsius. In some embodiments, the outer surface is treated so as to have the reflectivity of greater than 50%. In some embodiments, the outer surface is coated with a coating having the reflectivity of greater than 50%. In some embodiments, a conductor layer is optionally disposed around the strength member.

In some embodiments, an apparatus includes a strength member, including: a core formed of a composite material, and an encapsulation layer disposed around the core. A conductor layer is disposed around the strength member. A coating is disposed on the conductor layer. The coating is formulated to have an erosion resistance that is at least 5% greater than an erosion resistance of aluminum or aluminum alloys.

In some embodiments, an assembly includes a conductor, including: a strength member, including: core formed of a composite material, and an encapsulation layer disposed around the core; and a conductor layer is disposed around the strength member. A coupler is coupled to an axial and of the conductor. A coating is disposed on an outer surface of the coupler, the coating formulated to have at least one of a solar absorptivity of less than 0.5 at a wavelength of less than 2.5 microns or a radiative emissivity of greater than 0.5 at a wavelength in a range of 2.5 microns to 15 microns, at an operating temperature in a range of 60 degrees Celsius to 250 degrees Celsius.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
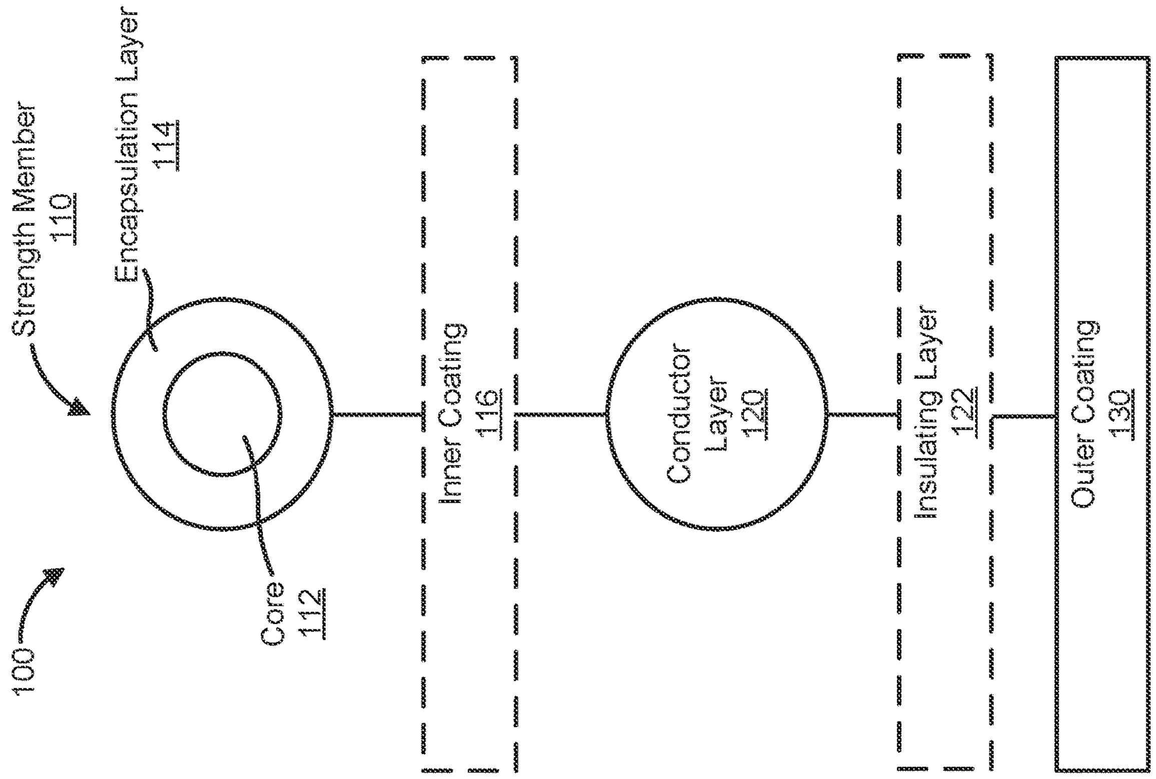
FIG. 1 is a schematic illustration of a conductor for use in grid electrical transmission that includes an outer coating disposed on a conductor layer of the conductor, which has low solar absorptivity and high radiative emissivity, and may also have high erosion resistance, high corrosion resistance, and may optionally, include an inner coating that has high reflectivity coated on a strength member of the conductor, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for electrical transmission and distribution using coated conductors or conductor surface modification and, in particular, to electrical conductors that include a strength member including a composite core and an encapsulation layer disposed around the composite core, and a conductor layer(s) that may include a plurality of strands of a conductive material disposed (e.g., wrapped or stranded) around the strength member. A coating having low solar absorptivity and high radiative emissivity is disposed around at least the conductor layer to reduce solar absorption and increase radiative emissivity of the conductor, thus reducing operating temperature of the conductor for transmitting a particular current and/or increasing the ampacity of the conductor at a particular operating temperature relative to a non-coated conductor. The reduced operating temperature also reduces the conductor resistance and associated line loss in PowerGrid.

The coating may additionally, have high erosion resistance to prevent unintentional cutting of the conductor layer, for example, from shearing by kite strings. Moreover, the encapsulation layer may additionally or alternatively be configured to have high reflectivity, and/or an outer surface of the conductor layer may be configured to have low reflectivity. Embodiments described herein are applicable to conductors with strength members that include composite material(s), but without encapsulation, or strength members that do not include composite material(s), for example, strength members including steel strands, or aluminum or aluminum alloy strands in a conductor. Embodiments described herein are also applicable to electrical distribution at low voltages, such as, for example, at operating voltages of 69 kV or below. The coatings described herein may be configured to include any combination of the properties and/or functionalities described herein including, but not limited to reduced solar absorptivity, increased radiative emissivity, and/or improved erosion resistance or corrosion resistance of the conductor. Any of the strength members described herein can be metallic or fiber reinforced inorganic or metallic matrix composite, and can be insulative or conductive.

As the demand for electricity grows, there is an increased demand for higher capacity electricity transmission and distribution lines. The amount of power delivered by an electrical conductor is dependent on the ampacity of the conductor transmitting the electric current. The ampacity of such conductors is however, limited by the operating temperature of the conductor. Too high a temperature can damage the conductor or other components of the PowerGrid system. The inherent resistance of the conductor causes heat to be generated by the conductor, further increasing the operating temperature of the conductor. Moreover, since conductors are generally formed of metallic materials, conductors used for grid transmission and distribution are good absorbers of solar radiation. For example, the solar radiation incident on overhead conductors could be 1000 $W/ft^2$ or even higher. Absorption of solar radiation also increases the operating temperature of such conductors, thus further increasing the operating temperature of the conductor and decreasing the current carrying capacity of electrical conductors.

The amount of solar radiation absorbed by the conductor depends upon the conductor's surface's coefficient of absorptivity ("solar absorptivity") with a low absorptivity indicating that the conductor absorbs only a small amount of solar radiation. Moreover, a conductor can lose heat by conduction, convection, or radiation (e.g., emitting heat as photons). The amount of heat radiated by the conductor into the environment depends on the conductor's surface's coefficient of emissivity ("radiative emissivity"), with a high radiative emissivity indicating that the conductor is emitting a higher amount of heat relative to a conductor with low radiative emissivity.

Additionally, many conductors are made from soft materials such as aluminum, which is susceptible to erosion and cutting. For example, in countries such as Brazil, India, and Pakistan, kite flying is a common recreational activity. While kite strings are generally made of fabrics, many kite flyers use strings that are imbued with glass shards or metal files, or use metal strings to fly their kites. Such strings can cut through the insulating jackets that are sometimes disposed around conductor strands, and if such strings include conducting material, can cause electrocution of the kite flyer. Moreover, such strings can also cut through the conductor layers severing the conductors that can causing live wires to fall also creating electrocution hazards and lead to loss of electrical power transmission. Just in Brazil, thirty kite cutting related accidents were reported over the last seven years, including five fatalities in 2020. Similar incidents have been reported in India and Pakistan.

Some conductors have outer conductor layers that are shiny which causes them to have high reflectivity. This is undesirable because light reflected from such electrical conductors can distract drivers driving on roads near which such conductors are located, or cause their vision to be impaired. This can be a serious safety hazard and can lead to accidents.

Embodiments of the conductors described herein that include a strength member and a conductor layer disposed around the strength member, and that include low solar absorptivity and high radiative emissivity coating disposed around the conductor layer that may additionally or alternately, may also have sufficient hardness so to have substantial erosion or cutting resistance, and optionally, also a high reflective surface treatment around the strength member, may provide one or more benefits including, for example: 1) reducing solar adsorption and increasing radiative emission from the conductor layer included in the conductor, thereby allowing the conductors to operate cooler, or conduct a larger amount of current (i.e., have a greater ampacity) at the same operating temperature; 2) reducing heat absorption into the strength member by additionally providing a low absorptivity or high reflectivity surface treatment on the strength member, thus reducing a temperature of the strength member that may be susceptible to degradation if exposed to temperatures above a temperature threshold; 3) protecting a surface of the conductors from scratching thus reducing corona effect, providing ultraviolet resistance, and increasing durability; 4) inhibiting cutting and/or erosion of the conductors by kite strings or other environmental factors, thereby increasing safety and reducing transmission loss; 5) protecting the composite core of the strength member from moisture and/or solvents that may damage the composite core; 6) enhancing reflectivity of an encapsulation layer of a composite core of a conductor, thereby reducing heat transfer to the composite core and allowing operation of the conductor at higher temperatures; 7) reducing reflectivity of outer conductor layer of conductors, thereby increasing road safety by reducing reflections from such conductors that can affect visibility of drivers; and 8) improving performance of the conductors without impacting functionality, reliability, and/or performance of the conductor.

FIG. 1 is a schematic illustration of a conductor 100, according to an embodiment. The conductor 100 includes a strength member 110, a conductor layer 120 disposed around the strength member 110, and an outer coating 130 disposed around the conductor layer 120.

The strength member 110 includes a core 112 and an encapsulation layer 114 disposed around the core 112, for example, disposed circumferentially around the core 112. The core 112 may be formed from a composite material. In some embodiments, the composite material may include nonmetallic fiber reinforced metal matrix composite, carbon fiber reinforced composite of either thermoplastic or thermoset matrix or even metallic matrix, or composites reinforced with other types of fibers such as quartz, AR-Glass, E-Glass, S-Glass, H-Glass, silicon carbide, silicon nitride, alumina, basalt fibers, specially formulated silica fibers, any other suitable composite material, or any combination thereof. In some embodiments, the composite material includes a carbon fiber reinforced composite of a thermoplastic or thermoset resin. The reinforcement in the composite strength member(s) can be discontinuous such as whiskers or chopped fibers; or continuous fibers in substantially aligned configurations (e.g., parallel to axial direction) or randomly dispersed (including helically wind or woven configurations). In some embodiments, the composite material may include a continuous or discontinuous polymeric matrix composites reinforced by carbon fibers, glass fibers, quartz, ceramic fibers such as alumina fibers, or other reinforcement materials, and may further include fillers or additives (e.g., nanoadditives). In some embodiments, the core 112 may include a carbon composite including a polymeric matrix of epoxy resin cured with anhydride hardeners.

The core 112 may have any suitable cross-sectional width (e.g., diameter). In some embodiments, the core 112 has a diameter in a range of about 2 mm to about 15 mm, inclusive (e.g., 2, 3, 4, 5, 6, 7, 8, 9, 10, 11, 12, 13, 14, or 15 mm, inclusive). In some embodiments, the core 112 may have a diameter in a range of about 5 mm to about 10 mm, inclusive. In some embodiments, the core 112 may have a diameter in a range of about 10 mm to about 15 mm, inclusive. In some embodiments, the core 112 may have a diameter in a range of about 7 mm to about 12 mm, inclusive. In some embodiments, the core 112 may have a diameter of about 9 mm. In some embodiments, the core 112 may have a glass transition temperature (e.g., for thermoset composites), or melting point of at least about 70 degrees Celsius (e.g., at least 75, at least 80, at least 90, at least 100, at least 120, at least 140, at least 150, at least 160, at least 180, at least 200, at least 220, at least 240, or at least 250, degrees Celsius, inclusive). The glass transition temperature or melting point of the core 112 may correspond to a threshold operating temperature of the conductor 100, which may limit the ampacity of the conductor 100. In other words, a maximum amount of current that can be delivered through the conductor 100 is the current at which the operating temperature of the conductor 100, or at least the temperature of the core 112 is less than the glass transition temperature or melting point of the composite core 112.

In some embodiments, the core 112 defines a circular cross-section. In some embodiments, the core 112 may define an ovoid, elliptical, polygonal, or asymmetrical cross-section. In some embodiments, the strength member 110 may include a single core 112. In other embodiments, the strength member 110 may include multiple cores, for example, 2, 3, 4, or even more, with the encapsulation layer 114 being disposed around the multiple cores or around each individual core. In such embodiments, each of the multiple cores may be substantially similar to each other, or at least one of the multiple cores may be different from the other cores (e.g., have a different size, different shape, formed from a different material, have components embedded therein, etc.).

In some embodiments, the core 112 is solid, i.e., does not include any holes or voids therein other than a de minimis amount of naturally occurring voids or porosities that may form during a fabrication process of the core 112. In some embodiments, the core 112 may be hollow, for example, define one or more deliberately formed channels or voids therein or therethrough (e.g., extending axially along and/or defined about a longitudinal axis of the strength member 110). Sensing or transmission components may be embedded within the void or channels defined in the core 112. For example, in some embodiments, sensors such as strain gages, accelerometers, or optical fiber sensors may be disposed within, or extend through the core 112. The sensors may be configured to sense various operating parameters of the conductor 100, for example, mechanical strain, sag (i.e., the vertical difference between the points of support of the conductor 100 to a lowest point of the conductor 100), operating temperature, voltage, or current passing through the conductor 100, any other suitable operating parameter or a combination thereof. In some embodiments, the optical fibers extending through the core 112 may include communication optical fibers. In such embodiments, the optical fibers may communicate an optical signal (e.g., transmit sensor data, internet, or media signals, etc.) therethrough.

The encapsulation layer 114 is disposed around the core 112, for example, circumferentially around the core 112. In some embodiments, an inner insulation layer (not shown) may optionally be interposed between the core 112 and the encapsulation layer 114. The inner insulation layer may be formed from any suitable insulative material, for example, glass fibers (disposed either substantially parallel to axial direction or woven or braided glass), a resin layer, an insulative coating, any other suitable insulative material or a combination thereof. In some embodiments, the inner insulation layer may also be disposed on axial ends of the core 112, for example, to protect the axial ends of the core 112 from corrosive chemicals, environmental damage, etc.

The encapsulation layer 114 may be formed from any suitable electrically conductive or non-conductive material. In some embodiments, the encapsulation layer 114 may be formed from a conductive material including, but not limited to aluminum (e.g., 1350-H19), annealed aluminum (e.g., 1350-0), aluminum alloys (e.g., Al—Zr alloys, 6000 series Al alloys such as 6201-TS1, -T82, -T83, 7000 series Al alloys, 8000 series Al alloys, etc.), copper, copper alloys (e.g., copper magnesium alloys, copper tin alloys, copper micro-alloys, etc.), any other suitable conductive material, or any combination thereof. In some embodiments, the encapsulation layer 114 is formed from Al and is optionally pretensioned, i.e., is under tensile stress after being disposed on the core 112.

The encapsulation layer 114 may be disposed on the core 112 using any suitable process. In some embodiments, the encapsulation process 114 for disposing the encapsulation layer 114 around the core 112 using a conforming machine. For example, the encapsulation process may be performed with a similarly functional machine other than a conforming machine, and be optionally further drawn to achieve target characteristics of the encapsulation layer 114 (e.g., a desired geometry or stress state). The conforming machines or the similar machines used for disposing the encapsulation layer 114 may allow quenching of the encapsulation layer 114. The conforming machine may be integrated with stranding machine, or with pultrusion machines used in making fiber reinforced composite strength members. While FIG. 1 shows a single encapsulation layer 114 disposed around the core 112, in some embodiments, multiple encapsulation layers 114 may be disposed around the core 112. In such embodiments, each of the multiple encapsulation layers 114 may be substantially similar to each other, or may be different from each other (e.g., formed from different materials, have different thicknesses, have different tensile strengths, etc.). In some embodiments, core 112 may include a carbon fiber reinforced composite, and the encapsulation layer 114 may include aluminum, for example, pretensioned or precompressed aluminum.

In some embodiments, the interface between the core 112 and the encapsulation layer 114 may optionally include surface features, for example, grooves, slots, notches, indents, detents, etc. to enhance adhesion, bonding and/or interfacial locking between a radially outer surface of the core 112 and a radially inner surface of the encapsulation layer 114. Such surface features may facilitate retention and preservation of the stress from pretensioning in the encapsulation layer 114. In some embodiments, the composite core 112 may have a glass fiber tow disposed around its outer surface to create a screw shape or twisted surface. In some embodiments, a braided or woven fiber layer is applied in the outer layer of the core 112 to promote interlocking or bonding between the core 112 and the encapsulation layer 114.

In some embodiments, the encapsulation layer 114 may have a thickness in a range of about 0.3 mm to about 5 mm, inclusive, or even higher (e.g., 0.3, 0.5, 1, 1.5, 2.0, 2.5, 3.0, 3.5, 4.0, 4.5, 5.0 mm, inclusive, or even higher). In some embodiments, a ratio of an outer diameter of the encapsulation layer 114 to an outer diameter of the core 112 is in range of about 1.2:1 to about 5:1, inclusive (e.g., 1.2:1, 1.5:1, 2:1, 2.5:1, 3:1, 3.5:1, 4:1, 4.5:1, or 5:1, inclusive).

In some embodiment, the strength member may have a minimum level of tensile strength, for example, at least 600 MPa (e.g., at least 600, at least 700, at least 800, at least 1,000, at least 1,200, at least 1,400, at least 1,600, at least 1,800, or at least 2,000 MPa). In some embodiments, the elongation during pretension of the strength member 110 may include elongation by at least 0.01% strain (e.g., at least 0.01%, at least 0.05%, at least 0.1%, at least 0.15%, at least 0.2%, at least 0.25%, at least 0.3%, at least 0.35%, at least 0.4%, at least 0.45%, or at least 0.5% strain, inclusive) depending on the type of strength members and the degree of knee point reduction, and the strength member 110 may be pre-tensioned before or after entering the conforming machine. Moreover, the strength member 110 may be configured to endure radial compression from crimping of conventional fittings as well as radial pressure during conforming of drawing down process or folding and molding of at least 3 kN (e.g., at least 3, at least 4, at least 5, at least 10, at least 15, at least 20, or at least 25 kN, inclusive), for example for composite cores 112 with little to substantially no plastic deformation.

In some embodiments, the encapsulation layer 114 may have an outer surface that is configured to be smooth and shiny (e.g., surface treated) so as to reduce absorptivity (i.e., enhance reflectivity) thus reducing an operating temperature of the core 112. Specifically, the smooth outer surface of the encapsulation layer 114 may be configured to reflect heat generated by the conductor layer 120 (e.g., conductive strands that form the conductor layer 120) due to resistance heating of the conductor layer 120 because of the electrical current passing therethrough. The resistance heating may be particularly prominent on the outer layers forming the conductor layer or proximate to outer surface of the conductor layer 120 (e.g., proximate to outer surface of each conductive strand forming the conductor layer 120) because of skin effect caused by electrons flowing proximate to the outer surface in an AC circuit.

By inhibiting heat transfer to the core, the shiny encapsulation layer can prevent the temperature of the core 112 from exceeding its glass transition temperature or melting point. As described in further detail herein, the outer coating 130 may be formulated to have high radiative emissivity in the 2.5 microns to 15 microns wavelength, inclusive, of the thermal radiation. While this may cause cooling of the conductor layer 120, the radiated heat will also travel towards the strength member 110 and cause heating of the core 112, for example, cause the core 112 to be at a higher operating temperature than the conductor layer 120, which is undesirable. To reduce absorption of this emitted radiation, the outer surface of the encapsulation layer 114 may be sufficiently reflective so as to have absorptivity of less than 0.6 (e.g., less than 0.55, less than 0.5, less than 0.45, less than 0.4, less than 0.35, less than 0.3, less than 0.25, less than 0.2, less than 0.15, or less than 0.1, inclusive) at a wavelength in a range of 2.5 microns to 15 microns, inclusive (e.g., 2.5, 3.0, 3.5, 4.0, 4.5, 5.0, 5.5, 6.0, 6.5, 7.0, 7.5, 8.0, 8.5, 9.0, 9.5, 10.0, 11, 12, 13, 14, or 15 microns, inclusive), at an operating temperature of the conductor 100 in a range of 90 degrees Celsius to 250 degrees Celsius, inclusive (e.g., 90, 100, 120, 140, 160, 180, 200, 220, 240, or 250 degrees Celsius, inclusive).

In some embodiments, the outer surface of the encapsulation layer 114 is at least one of treated, coated with a coating (e.g., the inner coating 116), or otherwise be configured as to have a reflectivity of greater than about 50% (e.g., greater than 50%, greater than 60%, greater than 65%, greater than 70%, greater than 75%, greater than 80%, greater than 85%, greater than 90%, or greater than 95%, inclusive) at thermal radiative wavelengths corresponding to an operating temperature of greater than about 90 degrees Celsius. In some embodiments, the outer surface has a reflectivity of greater than about 55%. In some embodiments, the outer surface has a reflectivity of greater than about 60%. In some embodiments, the outer surface has a reflectivity of greater than about 65%. In some embodiments, the outer surface has a reflectivity of greater than about 70%. In some embodiments, the outer surface has a reflectivity of greater than about 75%. In some embodiments, the outer surface has a reflectivity of greater than about 80%. In some embodiments, the outer surface has a reflectivity of greater than about 85%. In some embodiments, the outer surface has a reflectivity of greater than about 90%. In some embodiments, the outer surface has a reflectivity of greater than about 95%.

In some embodiments, the outer surface of the encapsulation layer 114 may be surface treated (e.g., plasma treated, texturized, etc.) to have the absorptivity or reflectivity as described above. In some embodiments, the strength member 110, i.e., the outer surface of the encapsulation layer 114 may be optionally coated with an inner coating 116 to reduce solar absorptivity. For example, the inner coating 116 may be disposed between the encapsulation layer 114 and the conductor layer 120. In some embodiments, the inner coating 116 may be formulated to have an absorptivity of less than 0.6 (e.g., less than 0.6, less than 0.55, less than 0.5, less than 0.45, less than 0.4, less than 0.35, less than 0.3, less than 0.25, less than 0.2, less than 015, or less than 0.1, inclusive) at a wavelength in a range of 2.5 microns to 15 microns, inclusive (e.g., 2.5, 3.0, 3.5, 4.0, 4.5, 5.0, 5.5, 6.0, 6.5, 7.0, 7.5, 8.0, 8.5, 9.0, 9.5, 10.0, 11.0, 12.0, 13.0, 14.0, or 15.0 microns, inclusive), at an operating temperature of the conductor 100 in a range of 90 degrees Celsius to 250 degrees Celsius, inclusive (e.g., 90, 100, 120, 140, 160, 180, 200, 220, 240, or 250 degrees Celsius, inclusive). The inner coating 116 may be configured to reflect a substantial amount of radiation (e.g., heat radiated to the encapsulation layer 114 from the conductor layer 120) in the wavelength of equal to or longer than 2.5 microns (e.g., at least 50% of radiation in a wavelength of equal to or longer than 2.5 microns that is incident on the encapsulation layer 114). In some embodiments, a thickness of the inner coating 116 may be in a range of 1 micron to 500 microns, inclusive (e.g., 1, 5, 10, 20, 30, 40, 50, 60, 70, 80, 90, 100, 150, 200, 250, 300, 350, 400, 450, or 500 microns, inclusive). In some embodiments, the inner coating 116 may have a reflectivity of greater than about 50% (e.g., greater than 50%, greater than 60%, greater than 65%, greater than 70%, greater than 75%, greater than 80%, greater than 85%, greater than 90%, or greater than 95%, inclusive) at thermal radiative wavelengths corresponding to an operating temperature of greater than about 90 degrees Celsius. In some embodiments, the inner coating 116 may have a reflectivity of greater than about 55%. In some embodiments, the inner coating 116 may have a reflectivity of greater than about 60%. In some embodiments, the inner coating 116 may have a reflectivity of greater than about 65%. In some embodiments, the inner coating 116 may have a reflectivity of greater than about 70%. In some embodiments, the inner coating 116 may have a reflectivity of greater than about 75%. In some embodiments, the inner coating 116 may have a reflectivity of greater than about 80%. In some embodiments, the inner coating 116 may have a reflectivity of greater than about 85%. In some embodiments, the inner coating 116 may have a reflectivity of greater than about 90%. In some embodiments, the inner coating 116 may have a reflectivity of greater than about 95%.

In some embodiments, the inner coating 116 may include nanoporosities for example, voids or holes in a size equal to or less than 700 nm (e.g., in a range of 10 nm to 700 nm, inclusive) to cause the inner coating 116 to have the absorptivity of less than 0.5 as described herein. The inner coating 116 may be formed from any suitable material and include any suitable additives to cause the inner coating 116 to have the absorptivity of less than 0.5 microns, as described herein. In some embodiments, the inner coating 116 may include a binder and a reflective agent. In some embodiments, the inner coating 116 may also include fillers, stabilizers, colorants, surfactants, and reflective agents configured to enhance reflection in the 2.5 micron to 15 micron range, inclusive. In some embodiments, the inner coating 116 may include inorganic materials, and may be substantially free of organic materials (e.g., have less than 10% organic material).

In some embodiments, a concentration of a binder in the inner coating 116 may be in a range of 20% to 60%, inclusive (e.g., 20%, 25%, 30%, 35%, 40%, 45%, 50%, 55%, or 60%, inclusive of all ranges and values therebetween). In some embodiments, a concentration of the binder in the inner coating 116 may be at least 20%. In some embodiments, a concentration of the binder in the inner coating 116 may be at most 60%.

In some embodiments, the binder may include a functional group such as, for example, hydroxyl, epoxy, amine, acid, cyanate, silicate, silicate ester, ether, carbonate, maleic, etc. Inorganic binders may include, but are not limited to, metal silicates, such as potassium silicate, sodium silicate, lithium, silicate and magnesium, aluminum silicate, peptized aluminum oxide monohydrate colloidal silica, colloidal alumina, aluminum phosphate and combinations thereof. In some embodiments, the inner coating 116 may include one or more reflective additives including, but not limited to cobalt, aluminum, bismuth, lanthanum, lithium, magnesium, neodymium, niobium, vanadium, ferrous, chromium, zinc, titanium, manganese, and nickel-based metal oxides and ceramics. In some embodiment, the reflective additives may be used in a concentration in a range of about 0.1% to about 5%, inclusive (by weight of the total dry composition of the inner coating) either individually or mixed with colorants.

In some embodiments, one or more stabilizers may be included in the inner coating 116, for example, at a concentration in a range of about 0.1% to about 2%, inclusive (by weight of the total dry composition). Examples of stabilizers include, but are not limited to, dispersion stabilizer, such as bentonites. One or more colorants may be used in the inner coating 116, for example, at a concentration in a range of about 0.02% to 0.2%, inclusive (by weight of the total dry composition). The colorant can be organic or inorganic pigments, including, but not limited to, titanium dioxide, rutile, titanium, anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zine ferrite), and combinations thereof. In some embodiments, one or more surfactants may also be used in the inner coating 116, for example, at a concentration in a range of about 0.05% to about 0.5%, inclusive (by weight of the total dry composition). Suitable surfactants include, but are not limited to, cationic, anionic, or non-ionic surfactants, and fatty acid salts.

In some embodiments, the inner coating 116 may include TEFLON®, polytetrafluoroethylene (PTFE), or polyvinylidene fluoride (PVDF), copolymers, or any suitable combination thereof, which may be formulated as a paint, and may include additives such to enhance solar reflectivity, i.e., reduce absorptivity in the 2.5 micron to 15 micron range, inclusive. In some embodiments, the inner coating 116 may include polyvinylidene fluoride-co-hexafluoropropylene (PVDF-HFP) having a nanoporosity in a range of 50% or higher causing the inner coating 116 to have the absorptivity of less than 0.5 at the wavelength in a range of 2.5 microns to 15 microns, inclusive, and at the operating temperature in a range of 60 degrees Celsius to 250 degrees Celsius, inclusive, as previously described herein. In some embodiments, the inner coating 116 may include nanocellulose fibers having a mesoporous structure. In some embodiments, the inner coating 116 may include alumina, $SiO_2$, and porous PTFE.

In some embodiments, the inner coating 116 may include particles, for example, core-shell particles having a wide band-gap configured to reduce absorptivity. Such particles may include particles of inorganic materials such as, for example, $Al_2O_3$, $BaSO_4$, etc. While $TiO_2$ may be used, it may have a higher absorptivity decreasing its utility. In some embodiments, the inner coating 116 may include PVDF-HFP that may be dissolved in a small amount of a solvent (e.g., acetone), and then water, for example, in a ball milling operation such that the inner coating 116 has nanoporosities in a range of about 10 nm to about 700 nm, inclusive (e.g., 10, 20, 30, 40, 50, 60, 70, 80, 90, 100, 150, 200, 250, 300, 350, 400, 450, 500, 550, 600, 650, or 700 nm, inclusive). In some embodiments, a thickness of such an inner coating 116 may be in a range of 50 microns to 300 microns, inclusive (e.g., 50, 100, 150, 200, 250, or 300 microns, inclusive). In some embodiments, the inner coating 116 may include one or more layers of silicon, ZnO, $HfO_2$, $TiO_2$, $MgF_2$, $Si_3N_4$, $Ta_2O_5$, and/or $ZnO_2$. In some embodiments, the inner coating 116 may include silver.

In some embodiments, a base coat of paint, varnish, or an adhesive may be applied to the outer surface of the encapsulation layer 114 to facilitate adhesion of the inner coating 116 to the encapsulation layer 114. The inner coating 116 may be applied in the form of a paint or slurry using any suitable method, for example, painting, dipping, spraying, evaporation, deposition follow by curing or cross-linking, or shrink wrapping. In some embodiments, the outer surface of the encapsulation layer 114 may be cleaned, for example, via solvents or using a mechanical means (e.g., sand blasted) to facilitate adhesion of the inner coating 116 to the outer surface of the encapsulation layer 114. In some embodiments, the inner coating 116 may optionally, be also disposed on an inner surface of the conductor layer 120 (e.g., an inner surface of a portion of conductive strands included in the conductor layer 120 that are disposed proximate to the outer surface of the encapsulation layer 114). In some embodiments, the inner coating 116 may be substantially durable, tough, and/or scratch resistant so as to protect the outer surface of the encapsulation layer 114 from damage, for example, during installation of the conductor layer 120 around the strength member 110.

As previously described, the strength member 110 may include a composite core 112 that may be black in color (e.g., includes a carbon composite). The core 112 may therefore, act as a black body absorbing radiation causing the core 112 to have a higher temperature relative to the conductor layer 120 or otherwise, the encapsulation layer 114. This may further reduce an upper limit of the operating temperature of the conductor 100 by up to 10 degrees Celsius, thus constraining the ampacity of the conductor 100. In contrast, the encapsulation layer 110 having the highly reflective outer surface, and/or the inner coating 116 having low absorptivity reflect a substantial portion of the heat emitted by the conductor layer 120 back into the environment. This may facilitate lowering an operating temperature of core 112, therefore protecting the core 112 and allowing the conductor 100 to operate at a higher temperature relative to the core 112 so as to inhibit the temperature of the core 112 from exceeding a threshold temperature (e.g., its glass transition temperature or melting point).

In some embodiments, the inner coating 116 may include a multilayer coating deposited using any suitable deposition method such, as for example, physical vapor deposition (PVD), chemical vapor deposition (CVD), microarc oxidation (MAO), plasma are oxidation (PAO), or any other suitable coating technique. In this manner, a highly effective reflective coating is deposited on the encapsulation layer 114, that is highly reflective in the wavelengths between about 2 micron to about 15 micron, inclusive, and inhibits heat absorption by the encapsulation layer 114 from the outer strands of the conductor layer 120. In some embodiments, the multilayer configuration may include layers having different refractive indices and having tailored thickness so as to provide a nearly perfect reflective coating for the radiative wavelengths in the temperature range between about 90 degrees Celsius to about 250 degrees Celsius. In some embodiments, the same inner coating may be interposed between the encapsulation layer 114 and the core 112, for example, to achieve the same purpose of keeping the core 112 at lower operating temperatures. Moreover, the inner coating 116 may cause the encapsulation layer 114 to have low thermal conductivity to inhibit conducive heat transfer to the core 112.

The conductor layer 120 is disposed around the strength member 110 and configured to transmit electrical signals therethrough at an operating temperature in a range of 60 degrees to 250 degrees Celsius, inclusive. In some embodiments, the conductor layer 120 may include a plurality of strands of a conductive material disposed around the strength member 110. For example, the conductor layer 120 may include a first set of conductive strands disposed around the strength member 110 in a first wound direction (e.g., wound helically around the strength member 110 in a first rotational direction), a second set of conductive strands disposed around the first set of strands in a second wound direction (e.g., wound helically around the first set of conducive strands in a second rotational direction opposite the first rotational direction), and may also include a third set of strands wound around the second set of strands in the first wound direction, and may further include any number of additional strands as desired.

In some embodiments, the conductor layer 120 (e.g., a plurality of strands of conductive material) may include, for example, aluminum, aluminum alloy, copper or copper alloy including micro alloy as conductive media, etc. In some embodiments, the conductor layer 120 may include conductive strands including Z, C or S wires to keep the outer strands in place. The conductor layer 120 may have any suitable cross-sectional shape, for example, circular, triangular, trapezoidal, etc. In some embodiments, the conductor layer 120 may include a stranded aluminum layer that may be round or trapezoidal. In some embodiments, the conductor layer 120 may include Z shaped aluminum strands. In some embodiments, the conductor layer 120 may include S shaped aluminum strands. In some embodiment, the conductor 100 may include any of the conductor layers described in U.S. Pat. No. 9,633,766, filed Sep. 23, 2015, and entitled "Energy Efficient Conductors with Reduced Thermal Knee Points and the Method of Manufacture Thereof," the entire disclosure of which is incorporated herein by reference.

In some embodiments, the strength member 110 may be optionally tensioned while the conductor layer 120 of aluminum or copper or their respective alloys disposed around the strength member 110 may be applied to cause the conductor 100 to form a cohesive conductive hybrid rod that is spoolable onto a conductor reel. In some embodiments, to facilitate conductor spooling onto a reel and conductor spring back at ease, the conductor 100 may be optionally configured to be non-round (e.g., elliptical) such that the shorter axis (in conductor 100) is subjected to bending around a spool (or a sheaves wheel during conductor installation) to facilitate a smaller bend or spool radius, while the strength members 110 may be configured to have a longer axis facilitate spring back for installation. The overall conductor 100 may be round with non-round strength member 110 or multiple strength members 110 arranged to be non-round, and the spooling bending direction may be along the long axis of the strength member 110 to facilitate spring back while not overly subjecting the conductor layer 120 with additional compressive force from spooling bending.

To further facilitate spooling of the conductor layer 120 on the strength member 110, in some embodiments, the conductor layer 120 may include multiple segments, for example, strands or sets of strands or wires of conductive material (e.g., 2, 3, 4, etc.), and each segment bonded to strength member 110 while retaining compressive stress, and the segments rotates one full rotation or more along the conductor 100 length (equal to one full spool in a reel) to facilitate easy spooling. Thus, the conductor 100 may be configured to have negligible skin effect (i.e., conducting layer thickness is less than the skin depth required at AC circuit frequency), with the strength member 110 may be under sufficient residual tensile stress, and the conductor layer 120 (e.g., each of the strands of the conductive material) are mostly free of tension or under compressive stress. In some embodiments, the strands of the conductive material may be formed from a conforming machine, for example, by extruding hot deformable (e.g., semi solid) conductive material (e.g., aluminum) from a mold. The strands can be molded to be round, trapezoidal, or any other desirable shape. In some embodiments, the extrusion mold or die may have a stranding lay ratio defined therein so that during the stranding operation of the conductive strands, no shaping may be needed (e.g., removing of sharp corners or edges of the conductive strands to avoid corona as is performed in conventional stranding operations). In some embodiments, the conductive media may be extruded out of the mold or die at an angle so as to form conductive strands that wrap around the strength member 110 at an angle, as described herein.

In some embodiments, for AC applications where skin effect is prominent, the conductor layer 120 may include a plurality of layers of conductive strands disposed concentrically around the strength member 110, with each layer being of finite thickness to maximize skin effect for lowest AC resistance at minimal conductor content. In some embodiments, the conductor layer 120 may be optionally stranded to facilitate conductor spooling around a reasonably sized spool and facilitate conductor stringing. In some embodiments, the outer most strands included in the conductor layer 120 may be TW, C, Z, S, or round strands if more aluminum or copper are used, as it will not cause permanent bird caging problem (i.e., the inner strands of the conductor layer 120 may not be deformed such that they prevent the outer strands from proper resettlement after tension is released or reduced). Accordingly, the smooth outer surface and the compact configuration can effectively reduce the wind load and ice accumulation on the conductor 100, resulting in less sag from ice or wind related weather events.

In some embodiments, the conductor 100 may be prestressed, for example, by subjecting the conformed conductor 100 to a paired tensioner approach or trimming the predetermined core 112 length before dead-ending, all accomplished without exerting the high tensile stress to the pole arms to pre-tension conventional conductors in the electric poles. For example, the conductor 100 may be subjected to pre-tensioning treatment using sets of bull wheels prior to the first sheave wheel during stringing operation, without exerting additional load to the electric towers. This can, for example, be accomplished by two sets of tensioners, with the first set maintaining normal back tension to the conductor drum/reel, while the second set restoring the normal stringing tension to avoid excessive load to electric poles or towers, for example, old towers in reconductoring projects. The conductor 100 may be subjected to the pre-tensioning stress between the $1^{st}$ and $2^{nd}$ tensioners, for example, about 2× of the average conductor every day tensile load to ensure that the pre-tensioning is driving its knee point below the normal operating temperature so that conductor layer 120 is not in tension for optimal self-damping and the conductor 100 substantially does not change its sag with temperature. In some embodiments, the conductor layer 120 (e.g., each strand of conductive material included in the conductor layer 120) may include aluminum having electrical conductivity of at least 50% ICAS, at least 55% ICAS, at least 60% ICAS, or at least 65% ICAS, or may include copper having electrical conductivity of at least 65% ICAS, at least 75% ICAS, or even at least 95% ICAS.

The conductor 100 may combine pre-tensioning with strength member 110 that may include an encapsulation layer 114 formed of a conductive material of sufficient compressive strength and thickness to substantially preserve the pre-tensioning stress in the strength member 110, while rendering the conductor layer 120 disposed around the strength member 110 mostly tension free or in compression after conductor field installation, and preserving the low thermal expansion characteristics of the strength member 110. The conductor 100 may have an inherently lower thermal knee point. Unlike gap conductors requiring complicated installation tools and process, where the conductor, fitting, installation, and repair are very expensive, the conductor 100 may be easy to install and repair, while maintaining low sag, high capacity, and energy efficiency as a result of knee point shift.

In some embodiments, metallurgical bonding may be provided between the strength member 110 and the conductor layer 120. In some embodiments, adhesives (e.g., Chemlok 250 from Lord Corp) may be applied to the surface of the strength member 110 of the conductor 100 to further promote the adhesion between the strength member 110 and the conductor layer 120 disposed thereon. Additionally, surface features on the strength member 110 may be incorporated to promote interlocking between the conductor layer 120 and the strength member 110 (e.g., stranded strength member 110 such as multi-strand composite cores in $C^7$ or steel wires in conventional conductors; pultruded composite core with protruding or depleting surface features; and an intentional rough surface on strength members such as ACCC core from CTC Global where a single or multiple strand glass or basalt or similar and other types of insulating material were disposed around the strength member 110, instead of just longitudinally parallel configuration described patent). In some embodiments, the conductor layer 120 may include aluminum, aluminum alloy, copper and copper alloys, lead, tin, indium tin oxide, silver, gold, nonmetallic materials with conductive particles, any other conductive material, conductive alloy, or conductive composite, or combination thereof.

It should be appreciated that, the conductor layer 120 may be under no substantial tension while the strength member 110 may be pre-stretched/tensioned. After the pre-tension in the strength member 110 is released, the conductor layer 120 may be subjected to compression, which may minimize the shrinking back of the strength member 110. The strength member 110 made with composite materials may have a strength above 80 ksi, and a modulus ranging from 5 msi to 40 msi, and a CTE of about $1\times10^{-6}$/° C. to about $8\times10^{-6}$/° C., inclusive.

The level of pre-tensioning in the conductor 100 may be dependent on conductor size, conductor configuration, conductor application environment and the desirable target thermal knee point. If the goal is to have a conductor thermal knee point at or near the stringing temperature (e.g., ambient), the tension desired onto the strength member 110 may only be about the same stringing sag tension (e.g., about 10% to about 20%, inclusive, of rated conductor strength), plus about 5% to about 50%, inclusive, of the stringing sag tension level (e.g., about 10% to about 30%, inclusive) extra to keep all aluminum included in the conductor layer 120 (or copper in the case of copper conductors) free of tension after stringing, which is significantly lower compared to conductor pre-tensioning in the electric towers where a load about 40% of conductor tensile strength are commonly used. If lower thermal knee point is desired, higher pre-tensioning stress may be used. It is also important to note that the composite core 112 of the strength member 110 may include carbon fibers that are strong, light weight, and have low thermal sag. The encapsulated strength member 110 using fiber reinforced composite materials, is particularly advantageous where the elastic strength member 110 facilitates spring back of the encapsulated strength member 110 from the reeled configuration for field installation. In some embodiments, the strength member 110 may be pre-strained by at least 0.05% (e.g., at least 0.05%, at least 0.1%, at least 0.15%, at least 0.2%, at least 0.25, or at least 0.3%, inclusive).

In some embodiments, for example, for AC transmission applications, the conductor layer 120 may include concentric layers (e.g., strands) of conductive media disposed around the strength member 110 during a conforming process. The skin depth may be adjusted based on transmission frequency. In some embodiments, the skin depth may be in a range of about 6 mm to about 12 mm, inclusive at 60 Hz (e.g., 6, 7, 8, 9, 10, 11, or 12 mm, inclusive), or in a range of about 12 mm to about 20 mm, inclusive at 25 Hz (e.g., 12, 13, 14, or 15 mm, inclusive) for pure copper. For pure aluminum, the skin depth may be in a range of about 9 mm to about 14 mm, inclusive at 25 Hz (e.g., 9, 10, 11, 12, 13, or 14 mm, inclusive) and in a range of about 14 mm to about 20 mm at 60 Hz (e.g., 14, 15, 16, 17, 18, 19, or 20 mm, inclusive). A thickness of each strand of conductive media included in the conductor layer 120 may be less than the maximum allowable depth, for example, to achieve low A/C resistance. In some embodiments, each of the conductive strands included in the conductor layer 120 may include copper having a thickness of up to 12 mm (e.g., up to 12, up to 11, up to 10, up to 9, or up to 8 mm, inclusive). In some embodiments, each of the conductive strands included in the conductor layer 120 may include aluminum having a thickness of up to 16 mm (e.g., up to 16, up to 14, up to 13, up to 12, up to 11, or up to 10 mm, inclusive). In some embodiments, a dielectric coating may be interposed between the conductive strands to optimize for the skin effect. In some embodiments, lubricants may be provided between adjacent conductive strands to facilitate some relative motion of the conductive strands included in the conductor layer 120.

In some embodiments, an interface between the strength member 110 and the conductor layer 120 may be further optimized with surface features in the strength member 110 enhancing interfacial locking and/or bonding between the strength member 110 and the conductor layer 120 to retain and preserve the stress from pretensioning. Such features may include, but are not limited to protruded features on an outer surface of the strength member 110 (e.g., and outer surface of the encapsulation layer 114 of the inner coating 116) as well as rotation of the strength member 110 around the axial direction. Furthermore, the same features can be incorporated into the interface between subsequent conductive strands included in the conductor layer 120. In some embodiments, the strength member 110 may include a glass fiber tow disposed around its surface to create a screw shape or twisted surface. In some embodiments, a braided or woven fiber layer is applied in the outer layer of the strength member 110 to promote interlocking or bonding between strength member 110 and the conductor layer 120. Steel wires may be shaped with similar surface features. In some embodiments, the strength member 110 may be pretensioned by pretensioning the reinforcement fibers in a matrix of conductive media such as aluminum or copper or their respective alloys. Such reinforcement fibers may include ceramic fibers, non-metallic fibers, carbon fibers, glass fibers, and/or others of similar types.

In some embodiments, an insulating layer 122 (e.g., a jacket) may optionally be disposed around the conductor layer 120. The insulating layer 122 may be formed from any suitable electrically insulative material, for example, rubber, plastics, or polymers (e.g., polyethylene, PTFE, high density polyethylene, cross-linked high density polyethylene, etc.). The insulating layer 122 may be configured to electrically isolate or shield the conductor 100. In some embodiments, the insulating layer 122 may be excluded.

In some embodiments, an outer surface of the conductor layer 120 (e.g., outer surface of the outermost conductive strands or an outer surface of each of the conductive strands) or the insulating layer is treated with features and/or include features to cause the outer surface to have a solar absorptivity of less than 0.6 (e.g., less than 0.55, less than 0.5, less than 0.45, less than 0.4, less than 0.35, less than 0.3, less than 0.25, less than 0.2, less than 0.15, or less than 0.1, inclusive). In some embodiments, the outer surface has a solar absorptivity of less than 0.55. In some embodiments, the outer surface has a solar absorptivity of less than 0.5. In some embodiments, the outer surface has a solar absorptivity of less than 0.45. In some embodiments, the outer surface has a solar absorptivity of less than 0.4. In some embodiments, the outer surface has a solar absorptivity of less than 0.35. In some embodiments, the outer surface has a solar absorptivity of less than 0.30. In some embodiments, the outer surface has a solar absorptivity of less than 0.25. In some embodiments, the outer surface has a solar absorptivity of less than 0.20. In some embodiments, the outer surface has a solar absorptivity of less than 0.15. In some embodiments, the outer surface has a solar absorptivity of less than 0.10.

As described herein, some conductors generally include a conductor layer that has conductive strands which have a shiny outer surface. Such a shiny outer surface can create a driving hazard because it can reflect sunlight into the eyes of the individuals who may be driving on roads in proximity to the conductors. In contrast, the outer surface of the conductor layer 120 (e.g., the outer surface or at least a portion of the outer surface of one or more conductive strands included in the conductor layer 120) may be treated or otherwise configured to have low reflectivity to mitigate the reflection hazard. In some embodiments, the outer surface of the conductor layer 120 may be treated or otherwise configured to have a reflectivity of less than 50% corresponding to an operating temperature of greater than 90 degrees Celsius. In some embodiments, the outer surface of the conductor layer 120 may be treated or otherwise configured to have a reflectivity of less than 45%. In some embodiments, the outer surface of the conductor layer 120 may be treated or otherwise configured to have a reflectivity of less than 40%. In some embodiments, the outer surface of the conductor layer 120 may be treated or otherwise configured to have a reflectivity of less than 35%. In some embodiments, the outer surface of the conductor layer 120 may be treated or otherwise configured to have a reflectivity of less than 30%. In some embodiments, the outer surface of the conductor layer 120 may be treated or otherwise configured to have a reflectivity of less than 25%. In some embodiments, the outer surface of the conductor layer 120 may be treated or otherwise configured to have a reflectivity of less than 20%. In some embodiments, the outer surface of the conductor layer 120 may be treated or otherwise configured to have a reflectivity of less than 15%. In some embodiments, the outer surface of the conductor layer 120 may be treated or otherwise configured to have a reflectivity of less than 10%.

In some embodiments, the outer surface of the conductor layer 120 may be treated or otherwise configured to have a reflectivity of no more than 10%. In some embodiments, the outer surface of the conductor layer 120 may be treated or otherwise configured to have a reflectivity of no more than 15%. In some embodiments, the outer surface of the conductor layer 120 may be treated or otherwise configured to have a reflectivity of no more than 20%. In some embodiments, the outer surface of the conductor layer 120 may be treated or otherwise configured to have a reflectivity of no more than 25%. In some embodiments, the outer surface of the conductor layer 120 may be treated or otherwise configured to have a reflectivity of no more than 30%. In some embodiments, the outer surface of the conductor layer 120 may be treated or otherwise configured to have a reflectivity of no more than 35%. In some embodiments, the outer surface of the conductor layer 120 may be treated or otherwise configured to have a reflectivity of no more than 40%. In some embodiments, the outer surface of the conductor layer 120 may be treated or otherwise configured to have a reflectivity of no more than 45%. In some embodiments, the outer surface of the conductor layer 120 may be treated or otherwise configured to have a reflectivity of no more than 50%.

In some embodiments, the outer surface of the conductor layer 120 may be treated or otherwise configured to have a reflectivity in a range of 5% to 50%, inclusive. In some embodiments, the outer surface of the conductor layer 120 may be treated or otherwise configured to have a reflectivity in a range of 10% to 45%, inclusive. In some embodiments, the outer surface of the conductor layer 120 may be treated or otherwise configured to have a reflectivity in a range of 15% to 40%, inclusive. In some embodiments, the outer surface of the conductor layer 120 may be treated or otherwise configured to have a reflectivity in a range of 20% to 30%, inclusive. Combinations of the above-referenced reflectivities are also possible (e.g., at least about 5% and no more than about 50%, or at least about 10% and no more than about 40%), inclusive. In some embodiments, the outer surface of the conductor layer 120 may be treated or otherwise configured to have a reflectivity of about 50%. In some embodiments, the outer surface of the conductor layer 120 may be treated or otherwise configured to have a reflectivity of about 45%. In some embodiments, the outer surface of the conductor layer 120 may be treated or otherwise configured to have a reflectivity of about 40%. In some embodiments, the outer surface of the conductor layer 120 may be treated or otherwise configured to have a reflectivity of about 35%. In some embodiments, the outer surface of the conductor layer 120 may be treated or otherwise configured to have a reflectivity of about 30%. In some embodiments, the outer surface of the conductor layer 120 may be treated or otherwise configured to have a reflectivity of about 25%. In some embodiments, the outer surface of the conductor layer 120 may be treated or otherwise configured to have a reflectivity of about 20%. In some embodiments, the outer surface of the conductor layer 120 may be treated or otherwise configured to have a reflectivity of about 15%. In some embodiments, the outer surface of the conductor layer 120 may be treated or otherwise configured to have a reflectivity of about 10%.

The outer surface of the conductor layer 120 may be configured to have low reflectivity using any suitable treatment or process. In some embodiments, the outer surface of the conductor layer 120 or at least a portion of an outer surface of the conductor layer 120 (e.g., an outer surface of the outer most conductive strands that form the conductor layer 120) may be sandblasted to reduce its reflectivity.

In some embodiments, the outer surface or at least a portion of the conductor layer 120 may be brushed to create grooves, indents, imperfections, a dull finish on the outer surface of the conductor layer 120 to reduce the reflectivity of the outer surface. For example, the brush may include a rotating brush having a plurality of metallic bristles (e.g., steel bristles) or otherwise bristles formed from a hard material (e.g., carbon or diamond). As the brush is rotating, the conductor 100 may be translated proximate to the bristles of the brush, or alternately, the brush may be translated along an axial length of the conductor 100 such that the bristles of the rotating brush contact the outer surface of the conductor layer 120 and creates the grooves, indents or otherwise imperfections on the outer surface of the conductor layer 120. In some embodiments, two or more rotating brushes may be used. For example, the conductor 100 may be translated between two brushes rotating in the same or opposing directions to cause the bristles of the opposing brushes to contact the outer surface of the conductor layer 120 and create the grooves or imperfections. Reducing imperfections via brushing may create minimal debris relative to reducing reflectivity via sand blasting such that any substantial cleaning of the conductor 100 post brushing may not be needed.

As described herein, the ampacity of the conductor layer 120 and thus, the conductor 100 is limited by the operating temperature of the conductor 100. It is desirable to maintain the operating temperature of the conductor 100 below a threshold temperature (e.g., a glass transition temperature or melting point of the core 112), for example, to prevent damage to the core 112. To reduce the operating temperature of the conductor 100, the conductor 100 may also include an outer coating 130 disposed on the conductor layer 120. The outer coating 130 may be disposed on the outer surface of the conductor layer 120 in addition to, or alternatively to the outer surface being treated of the conductor layer 120 being treated or otherwise configured to reduce the reflectivity thereof, as described herein. The outer coating 130 is formulated to have a solar absorptivity of less than 0.6 (e.g., less than 0.6, less than 0.55, less than 0.5, 1 less than 0.45, less than 0.40, less than 0.35, less than 0.30, less than 0.25, less than 0.20, less than 0.15, less than 0.1, inclusive or even lower) at a wavelength of less than 2.5 microns, and a radiative emissivity of greater than 0.5 (e.g., greater than 0.50, greater than 0.55, greater than 0.60, greater than 0.65, greater than 0.70, greater than 0.75, greater than 0.80, greater than 0.85, greater than 0.90, greater than 0.95, inclusive, or even higher) at a wavelength in a range of 2.5 microns to 15 microns, inclusive at an operating temperature in a range of 60 degrees Celsius to 250 degrees Celsius, inclusive.

In some embodiments, the outer coating 130 is formulated to have a solar absorptivity of less than 0.55. In some embodiments, the outer coating 130 is formulated to have a solar absorptivity of less than 0.50. In some embodiments, the outer coating 130 is formulated to have a solar absorptivity of less than 0.45. In some embodiments, the outer coating 130 is formulated to have a solar absorptivity of less than 0.40. In some embodiments, the outer coating 130 is formulated to have a solar absorptivity of less than 0.35. In some embodiments, the outer coating 130 is formulated to have a solar absorptivity of less than 0.30. In some embodiments, the outer coating 130 is formulated to have a solar absorptivity of less than 0.25. In some embodiments, the outer coating 130 is formulated to have a solar absorptivity of less than 0.20. In some embodiments, the outer coating 130 is formulated to have a solar absorptivity of less than 0.15. In some embodiments, the outer coating 130 is formulated to have a solar absorptivity of less than 0.10. In some embodiments, the outer coating 130 is formulated to have radiative emissivity of greater than 0.55. In some embodiments, the outer coating 130 is formulated to have radiative emissivity of greater than 0.60. In some embodiments, the outer coating 130 is formulated to have radiative emissivity of greater than 0.65. In some embodiments, the outer coating 130 is formulated to have radiative emissivity of greater than 0.70. In some embodiments, the outer coating 130 is formulated to have radiative emissivity of greater than 0.75. In some embodiments, the outer coating 130 is formulated to have radiative emissivity of greater than 0.80. In some embodiments, the outer coating 130 is formulated to have radiative emissivity of greater than 0.85. In some embodiments, the outer coating 130 is formulated to have radiative emissivity of greater than 0.90. In some embodiments, the outer coating 130 is formulated to have radiative emissivity of greater than 0.95. For example, the coating 130 may be formulated to have a radiative emissivity of equal to or greater than 0.75 (e.g., 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, inclusive, or even higher) at a wavelength of about 6 microns, and a solar absorptivity of less than 0.3 (e.g., 0.29, 0.28, 0.27, 0.26, 0.25, 0.24, 0.23, 0.22, 0.21, 0.20, 0.15, 0.10, inclusive, or even lower) at a wavelength of less than 2.5 microns at an operating temperature of about 200 degrees Celsius.

The low solar absorptivity of the outer coating 130 at a wavelength of less than 2.5 microns causes the outer coating 130 to reflect a substantial amount of solar radiation (e.g., greater than 50%, greater than 60%, greater than 70%, greater than 80%, greater than 90%, or even greater than 95% of the incident solar radiation) in the wavelength of less than 2.5 microns, thus reducing solar absorption and inhibiting increase in operating temperature of conductor 100. Moreover, the high radiative emissivity of the outer coating 130 at the wavelength in a range of 2.5 microns to 15 microns causes the outer coating 130 to emit heat being generated by the conductor 100 due to passage of current therethrough as photons. This increases radiation of heat away from the conductor 100 into the environment, further reducing the operating temperature of the conductor 100. In some embodiments, the outer coating 130 may cause a reduction in operating temperature of the conductor 100 at a particular current in a range of about 5 degrees Celsius to about 40 degrees Celsius, inclusive (e.g., 5, 6, 7, 8, 9, 10, 12, 14, 16, 18, 20, 25, 30, 35, or 40 degrees Celsius, inclusive). Thus, the conductor 100 can be operated at a lower temperature at the same ampacity. Conversely, the ampacity of the conductor 100 may be increased at the same operating temperature, relative to a conductor that does not include the outer coating 130. In some embodiments, in which a coupler mechanism is crimped to an axial end of the conductor 100, for example, to couple the conductor 100 to another conductor, or a dead-end fitting for coupling the conductor 100 to a transmission pole or tower, etc., the outer coating 130 may also be coated on the such fittings, couplers, or tension hardware, such as for example, dead-end couplers, splice couplers, suspension clamps, or any other suitable fittings or couplers to keep the temperatures of such fittings as low as possible and extend the life thereof.

In some embodiments, the unique properties of the outer coating 130 may be caused by including microstructures and nanoporosities in the outer coating 130. For example, the outer coating 130 may include microstructures having a size in a range of 3 microns to 15 microns, inclusive (e.g., 3, 4, 5, 6, 7, 8, 9, 10, 11, 12, 13, 14, or 15 microns, inclusive), which are configured to cause the outer coating 130 to have the radiative emissivity of greater than 0 S, as previously described. In some embodiments, the microstructures may include micropores or voids that may be inherently present in the outer coating 130 or introduced during manufacturing operation of the outer coating 130 (e.g., a ball milling operation).

In some embodiments, the microstructure may include inorganic particles. For example, the microstructures may include metal oxides, metal nitrides, metal fluorides, metal carbides, metal carbonates, and/or rare earth elements. In some embodiments, the microstructures include $CaCO_3$, or other carbonate compounds such as $BaCO_3$, $MgCO_3$, $Li_2CO_3$, $Na_2CO_3$, $K_2CO_3$, or any similar compounds, for example, solid particles, hollow particles, and/or core-shell particles. The carboxyl bond of $CaCO_3$ has an absorption wavelength of about 6 micron that enhances radiative emissivity and thus, radiative cooling, particularly at operating temperatures of about 200 degrees Celsius. The ionic carbonate has strong absorption at 7 microns, while the covalent carbonate bond has strong absorption at 5.5 microns to 6 microns, and numerous other strong absorption peaks from 7 microns to 13 microns, inclusive. Other compounds with wavelength absorptive activities in the range of 3 to 15 micron range can also be considered as carbonate substitutes or in combination with carbonates in some embodiments.

In some embodiments, the microstructures may include silica (e.g., porous silica or randomly distributed $SiO_2$ spheres in a polymer matrix). In some embodiments, the microstructure may include $Al_2O_3$ (e.g., porous alumina) particles, $BaSO_4$ particles, or wide bandgap pigments. In some embodiments, the microstructures may include core-shell particles, and/or wide bandgap and multi-scaled particles, that promote reflection of incident sunlight, while having vibration modes that provide radiative emissivity in the 2.5 microns to 15 microns range. In some embodiments, the core-shell particles can be achieved through sol-gel coating, or hollow particles such as hollow silica, hollow cenospheres. In some embodiments, the microstructures may include gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, titanium dioxide, aluminum nitride, boron nitride, alumina, magnesium oxide, calcium oxide, any other suitable material, or combinations thereof.

The outer coating 130 also includes nanoporosities having a size in a range of about 30 nm to about 700 nm, inclusive (e.g., 30, 40, 50, 60, 70, 80, 90, 100, 120, 140, 160, 180, 200, 25, 300, 350, 400, 450, 500, 550, 600, 650, or 700 nm, inclusive), which are configured to cause the outer coating 130 to have the solar absorptivity in the range of less than 0.5. For example, the outer coating 130 may include void or holes having a size in the range of about 50 nm to about 500 nm, inclusive.

In some embodiments, the outer coating 130 may include a fluoropolymer and/or polyurethane. In some embodiments, the fluoropolymer may include PVDF-HFP polymer, and/or PVDF-IHIFP copolymers. The ethylene functional group in HFP has C—C and C—H bond that have a few vibrational modes corresponding to about 3.5 microns, about 6.9 and about 13.8 microns. The polyvinylidene difluoride has C—C, C—H, and C—F bonds with multiple vibrational modes at wavelength of greater than about 7 microns, and is thus, a strong broad band emitter. Thus, PVDF-IHFP can exhibit high radiative emissivity (e.g., equal to or greater than 0.9) in the 2.5 micron to 15 microns range.

In some embodiments, to form the PVDF-HFP outer coating 130, PVDF-HFP may be dissolved in a small amount of acetone (VOC), and the solution then diluted with water. Bimodal porosity distribution (e.g., a nanoporosity of about 200 nm for reducing solar absorptivity, and a microporosity in a range of about 5 microns to about 10 microns, inclusive, for high radiative emissivity may be achieved via ball milling. In some embodiments, microstructures may include in the coating composition (e.g., in a slurry or colloidal form). In some embodiments, the outer coating 130 may have a thickness in a range of about 50 microns to about 500 microns, inclusive (e.g., 50, 60, 70, 80, 90, 100, 120, 140, 160, 180, 200, 220, 240, 260, 280, 300, 320, 340, 360, 380, 400, 420, 440, 460, 480, or 500 microns, inclusive). In some embodiments, a base coat, varnish, or adhesive may be applied on an outer surface of the conductor layer 120 (e.g., on each of the conductive strands forming the conductor layer 120, only on the outer most conductive strands forming the conductor layer 120, or on an outer surface of the insulating layer 122 that may be disposed around the conductor layer 120) before disposing the outer coating 130 on the outer surface of the conductor layer 120.

In some embodiments, an outer surface of at least a portion of the conductive strands forming the conductor layer 120 may be cleaned, for example, using surfactants or solvents to provide a clean surface for depositing the outer coating 130. In some embodiments, the outer surface of the conductor layer 120 (e.g., each of the strands forming the conductor layer 120, the outer most strands, or an outer surface of the outer most strands) or the insulating layer 122 may be roughened (e.g., by sand blasting, brushing, etc.) to provide a rough surface to facilitate adhesion of the outer coating 130 thereto. This benefit may be provided in addition to the reduction in specularity and reflectivity of the outer surface that can be achieved by such treatments. In some embodiments, the base coat and/or the outer coating 130 may be hydrophobic, for example, to inhibit ice formation, inhibit fouling, protect against UV radiation, and inhibit water born dirt.

In some embodiments, the outer coating 130 may include TEFLON®, PTFE, or any other dielectric. In some embodiments, the outer coating 130 may include nanocellulose fibers. In some embodiments, the microstructures may include $TiO_2$ that has high emissivity to provide the high radiative emissivity of the outer coating 130, and the nanoporosities included in the outer coating 130 may provide the low solar absorptivity. In some embodiments, the outer coating 130 may also include colors or dyes (e.g., fluorescent dyes), to provide limited near-infrared and short wavelength infrared absorption.

In some embodiments, the outer coating 130 may include a paint, for example, black paint such as a polyurethane paint, having a resin matrix and may, optionally, include ceramic particles. In some embodiments, the outer coating 130 may include about 50% to about 99%, inclusive, by dry weight, of a suitable fluoro-copolymer compound (e.g., about 75% to about 95%, inclusive, by dry weight). In some embodiments, the outer coating 130 may include polymers cross-linked through any suitable method including, for example, moisture, chemical, heat, UV, Infrared (IR), and/or e-beam curing methods. Cross-linking agents can include, but are not limited to, cross-linking agents that are reactive to hydroxyls, acids, epoxides, amines, cyanate including monomers, or oligomers or polymers which have urethane, fluorine, silane, fluoro silane, fluoro silicones, silsesquioxanes, polytetrafluoroethylene ("PTFE"), epoxy, phenolic, ether, silicone, or acrylic groups in back bones or grafted, either alone or in combination with other functional groups, in liquid, semi-solid, or powdered forms. Suitable chemical cross-linking agents (e.g., reactive agents) may include a monomeric or oligomeric polymeric resin that, when mixed with a cross-linkable fluoro-copolymer, can promote curing of the composition. In some embodiments, the cross-linking agents may include acrylates, fluoro silanes, fluoro silicones, methacrylic esters, silanes (including methoxy silanes and epoxy silanes) metal catalysts, triallyl isocyanurate ("TAIC"), peroxides, or combinations thereof. In some embodiments, the fluoro-copolymer can have, for example, hydroxyl groups that can be cross-linked with a polyisocyanate cross-linking agent such as hexamethylene-6,6-diisocyanate ("HDI"). Such HDI agents can be either aromatic or aliphatic based. In some embodiments, a catalyst can additionally be included to accelerate the cross-linking reaction. Suitable cross-linking agents can be included, by dry weight, at about 1% to about 20%, inclusive, of the outer coating 130.

In some embodiments, the outer coating 130 may include additional components such as, for example, one or more fillers (e.g., microstructures), solvents, defoamers, emulsifiers, thickeners, UV and light stabilizers, or resins. In some embodiments, the outer coating 130 may include metal oxides, metal nitrides, metal fluorides, rare earth elements, and metal carbides such as, but not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide ("silica"), chromium oxides, iron oxide, boron carbide, boron silicide, copper chromium oxide, titanium dioxide, aluminum nitride, boron nitride, alumina, $HfO_2$, $BaSO_4$, and combinations thereof. Certain fillers, including for example, boron oxide, zinc oxide, cerium oxide, silicon dioxide, and titanium dioxide can act as an emissivity agent to improve the radiation of heat from the outer coating 130.

In some embodiments, suitable rare earth materials may include one, or more, of a rare earth oxide, a rare earth carbide, a rare earth nitride, a rare earth fluoride, or a rare earth boride. Examples of rare earth oxides include scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide. Examples of rare earth carbides include, but are not limited to, scandium carbide, yttrium carbide, cerium carbide, praseodymium carbide, neodymium carbide, samarium carbide, europium carbide, gadolinium carbide, terbium carbide, dysprosium carbide, holmium carbide, erbium carbide, thulium carbide, ytterbium carbide, and lutetium carbide. Examples of rare earth fluorides include, but are not limited to, scandium fluoride, yttrium fluoride, cerium fluoride, praseodymium fluoride, neodymium fluoride, samarium fluoride, europium fluoride, gadolinium fluoride, terbium fluoride, dysprosium fluoride, holmium fluoride, erbium fluoride, thulium fluoride, ytterbium fluoride, and lutetium fluoride. Examples of rare earth borides include, but are not limited to, scandium boride, yttrium boride, lanthanum boride, cerium boride, praseodymium boride, neodymium boride, samarium boride, europium boride, gadolinium boride, terbium boride, dysprosium boride, holmium boride, erbium boride, thulium boride, ytterbium boride, and lutetium boride.

In some embodiments, the filler can also include electrically conductive fillers including carbon nanotubes, graphene, and graphite. Such electrically conductive fillers can, in sufficient quantities, make the outer coating 130 coating conductive or semi-conductive. Additionally, such fillers can improve the heat-transfer properties of the outer coating 130. In some embodiments, the filler can have an average particle size of about 50 microns or less (e.g., about 10 microns or less, or about 500 nanometers or less). Suitable fillers can optionally be included in the outer coating 130 at less than about 50% by weight (e.g., in a range of about 1% to about 50% by weight, inclusive, or about 5% to about 20% by weight, inclusive).

In some embodiments, the outer coating 130 may include a defoamer, for example, to inhibit or retard the formation of foam (e.g., when water is added to the heat-resistant coating composition). Suitable examples of defoamers can include silicon-based antifoam agents and non-silicon-based antifoam agents. In some embodiments, a surfactant can also be used as a defoamer. Suitable surfactants may include, but are not limited to, cationic, anionic, or non-ionic surfactants, and fatty acid salts. In some embodiments, the defoamer may be about 0.1% to about 5% by weight, inclusive, of the outer coating 130.

In some embodiments, the outer coating 130 may include an emulsifier, for example, to maintain an even dispersion of compounds in a water solution. Suitable emulsifiers can include, but are not limited to, sodium lauryl sulfate, sodium dodecyl phenylsulfonate, potassium stearate, sodium dioctyl sulfosuccinate, dodecyl diphenyloxy disulfonate, ammonium nonyl phenoxyethyl poly(1)ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium $\alpha$-olefin ($C_{14}$-$C_{16}$) sulfonate, hydroxyl alkanol sulfate, tetra sodium N-(1,2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate. The emulsifier can be included in the outer coating 130 in a range of about 2% to about 3% by weight, inclusive, of the outer coating 130.

In certain embodiments, coalescent agents or thickeners can be added to improve the formation of a film on the outer coating 130. In such embodiments, a coalescing agent can be included at about 20% or less by weight of a coating composition (e.g., in a range of about 2% to about 10% by weight, inclusive). In certain embodiments, UV or light stabilizers can be added to the outer coating 130 to improve the exterior weather ability. Suitable UV or light stabilizers can include benzotriazole-type, triazine-type UV absorbers, and HALS compounds. The UV or light stabilizer can be included at about 0.1% to about 5%, by weight, inclusive, in the outer coating 130. Additional resins can be included in the outer coating 130 to improve the performance of the outer coating 130. For example, one, or more, acrylics, silicones, urethanes, silanes, fluoro silanes, silsesquioxanes, or epoxies can be added to the outer coating 130. Alternatively, or additionally, commercial lubricants, waxes, and friction reducers can be added to the coating composition. Such resins can improve various properties of the composition including, for example, processability, durability, and service life of the coating. Suitable resins can be included in the outer coating 130 at about 0.1% to about 40% by weight, inclusive.

In some embodiments, one or more binders may be included in the outer coating 130, for example, in a range of about 10% to about 70%, inclusive, by weight of the total dry composition of the outer coating 130 (e.g., about 10% to about 20%; 0, about 20% to about 30%, about 30% to about 40%, about 40% to about 50%, about 50% to about 60%, or about 60% to about 70%, inclusive). The binder may include a functional group, such as hydroxyl, epoxy, amine, acid, cyanate, silicate, silicate ester, ether, carbonate, maleic, methyltrimethoxysilane, etc. Inorganic binders can be, but are not limited to, metal silicates, such as potassium silicate, sodium silicate, lithium silicate and magnesium aluminum silicate; peptized aluminum oxide monohydrate; colloidal silica; colloidal alumina, aluminum phosphate and combinations thereof.

One or more heat radiating agents can be included in the outer coating 130, for example, at a concentration of about 1% to about 20%, inclusive (by weight of the total dry composition of the outer coating 130). The heat radiating agents include, but are not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, titanium dioxide, aluminum nitride, boron nitride, alumina, magnesium oxide, calcium oxide, and combinations thereof.

In some embodiments, one or more reflective additives may also be included in the outer coating 130. Such reflective additives may include, but are not limited to, cobalt, aluminum, bismuth, lanthanum, lithium, magnesium, neodymium, niobium, vanadium, ferrous, chromium, zinc, titanium, manganese, and nickel-based metal oxides and ceramics. The reflective additives may be included at a concentration of about 0.1% to about 5%, inclusive (by weight of the total dry composition) either individually or mixed with colorants. In some embodiments, one or more stabilizers may be used in the coating composition, for example, at a concentration of about 0.1% to about 2%, inclusive (by weight of the total dry composition). Examples of stabilizers include, but are not limited to, dispersion stabilizer, such as bentonites.

In some embodiments, one or more colorants may be used in the coating composition of the outer coating 130, for example, at a concentration of about 0.02% to 0.2%, inclusive (by weight of the total dry composition). The colorant can be organic or inorganic pigments, which includes, but are not limited to, titanium dioxide, rutile, titanium, anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zinc ferrite), and combinations thereof. In some embodiments, the outer coating 130 may include organic material (e.g., less than about 5% of organic material). For example, the coating composition may include sodium silicate, aluminum nitride, and an amino functional siloxane (silicone modified to include amino functional group(s)). In some embodiments, the amino functional siloxane may include amino dimethylpolysiloxane.

In some embodiments, the outer coating 130 includes a single layer or multiple layers, each formulated to have a solar absorptivity of less than 0.5 at a wavelength of less than 2.5 microns, and a radiative emissivity of greater than 0.5 at a wavelength in a range of 2.5 microns to 15 microns, inclusive at an operating temperature in a range of 60 degrees Celsius to 250 degrees Celsius, inclusive as previously described. In some embodiments, the outer coating 130 may include a bilayer coating. For example, the outer coating 130 may include a first layer disposed on the conductor layer 120 and a second layer disposed on the first layer. The first layer may have the radiative emissivity of greater than 0.5 at a wavelength in a range of 2.5 microns to 15 microns, inclusive at an operating temperature in a range of 60 degrees Celsius to 250 degrees Celsius, (e.g., a radiative emissivity of greater than 0.75 at a wavelength of about 6 microns at an operating temperature of about 200 degrees Celsius) thus facilitating heat radiation from the conductor 100. Moreover, the second layer may have the solar absorptivity of less than 0.5 at a wavelength of less than 2.5 microns, thus reflecting a substantial amount of solar radiation on the second layer back into the environment.

In some embodiments, the first layer of the outer coating 130 may include microstructures (e.g., any of the microstructures described herein) configured to cause the first layer to have the high radiative emissivity, as described herein. Moreover, the second layer may include nanoporosities configured to cause the second layer to have high refractivity, but low solar absorptivity, as described herein. Each of the first layer and the second layer may be formed from any suitable materials as described herein (e.g., PVDF-HFP, PTFE, TEFLON®, any other coating including any additives, binders, surfactants, etc. as described herein). In some embodiments, the second layer may be similar in structure to the inner coating 116, with the difference that the second layer is formulated or tuned to have solar absorptivity of less than 0.5 at a wavelength of less than 2.5.

The outer coating 130 may be applied in the form of a paint or slurry using any suitable method, for example, painting, dipping, spraying, evaporation, deposition follow by curing or cross-linking, or shrink wrapping. In some embodiments, the outer surface of the conductor layer 120 (e.g., at least the outer most conductive strands included in the conductor layer 120) may be cleaned, for example, to remove oil, grease, lubricants, dirt etc., that may have deposited on the conductive strands during manufacturing of the conductive strands. The outer surface of the conductive strands of the conductor layer 120 may be cleaned using any suitable method such as, for example, via acid, solvents or using a mechanical means (e.g., sand blasted) to facilitate adhesion of the outer coating 130 to the outer surface of the conductor layer 120. In some embodiments in which the insulating layer 122 is disposed around the conductor layer 120, the outer surface of the insulating layer 122 may be cleaned or texturized (e.g., via sand blasting) before depositing the outer coating 130 thereon. The deposited outer coating 130 may be dried using hot air, infrared or naturally dried.

In some embodiments, the outer coating 130 may provide one or more benefits such as, for example, being transparent, being electrically conductive, having less curing time during coating, having high thermal aging resistance, having reduced dust accumulation, having corrosion resistance, being hydrophobic, having ice accumulation resistance, having weather resistance, having scratch and abrasion resistance, having wear resistance, having flame resistance, having self-healing properties, having reduced surface friction, having better recoatability, having a reduction in conductor pull forces, or any combination thereof. Additionally, the outer coating 130 can impart improvements in conductor lifespan and performance. Hydrophobic properties can mean that a water droplet on a coating can have a contact angle of about 90° or more. In some embodiments, hydrophobic properties can mean that a water droplet on a coating can have a contact angle of about 130 degrees or more. Self-healing can be activated by exposure to one, or more conditions including normal atmospheric conditions, UV conditions, thermal conditions, or electric field conditions.

In some other embodiment, the outer coating 130 maybe hydrophilic, that minimizes formation of water droplets as the contact angle is substantially less than 90 degree. Such implementations may be particularly useful for reducing corona, especially for extremely high voltage (EHV) and/or ultrahigh voltage (UHV) applications where the voltage of the circuit can be above 200 kV. Such hydrophilic outer coatings 130 may include, but are not limited to polyethyelene glycol, hydrogels (e.g., silica hydrogels), silica, silicon dioxide, titanium dioxide, polyvinyl alcohol, any other suitable hydrophilic coating, or any suitable combination thereof.

In some embodiments, additionally or alternatively to the radiative and emissive properties described herein, the outer coating 130 may be a "hard coating" configured to have a hardness, cutting resistance, or erosion resistance that is at least 5% greater than a hardness, cutting resistance, or erosion resistance of aluminum or aluminum alloys. In this manner, the outer coating 130 may advantageously protect the conductor layer 120 (e.g., each of a plurality of conductive strands of the conductor layer 120) from erosion, cutting, or otherwise mechanical damage (e.g., from accidental cutting by kite strings).

In some embodiments, the outer coating 130 may have an erosion resistance that is at least 5% greater than an erosion resistance of aluminum or aluminum alloys. In some embodiments, the outer coating 130 may have an erosion resistance that is at least 10% greater than an erosion resistance of aluminum or aluminum alloys. In some embodiments, the outer coating 130 may have an erosion resistance that is at least 15% greater than an erosion resistance of aluminum or aluminum alloys. In some embodiments, the outer coating 130 may have an erosion resistance that is at least 20% greater than an erosion resistance of aluminum or aluminum alloys. In some embodiments, the outer coating 130 may have an erosion resistance that is at least 25% greater than an erosion resistance of aluminum or aluminum alloys. In some embodiments, the outer coating 130 may have an erosion resistance that is at least 30% greater than an erosion resistance of aluminum or aluminum alloys. In some embodiments, the outer coating 130 may have an erosion resistance that is at least 40% greater than an erosion resistance of aluminum or aluminum alloys. In some embodiments, the outer coating 130 may have an erosion resistance that is at least 50% greater than an erosion resistance of aluminum or aluminum alloys. In some embodiments, the outer coating 130 may have an erosion resistance that is at least 60% greater than an erosion resistance of aluminum or aluminum alloys. In some embodiments, the outer coating 130 may have an erosion resistance that is at least 70% greater than an erosion resistance of aluminum or aluminum alloys. In some embodiments, the outer coating 130 may have an erosion resistance that is at least 80% greater than an erosion resistance of aluminum or aluminum alloys. In some embodiments, the outer coating 130 may have an erosion resistance that is at least 90% greater than an erosion resistance of aluminum or aluminum alloys. In some embodiments, the outer coating 130 may have an erosion resistance that is at least 100% greater than an erosion resistance of aluminum or aluminum alloys.

In some embodiments, the outer coating 130 has a Vicker hardness of greater than 175 MPa. In some embodiments, the outer coating 130 has a Vicker hardness of greater than 200 MPa. In some embodiments, the outer coating 130 has a Vicker hardness of greater than 250 MPa. In some embodiments, the outer coating 130 has a Vicker hardness of greater than 300 MPa. In some embodiments, the outer coating 130 has a Vicker hardness of greater than 400 MPa. In some embodiments, the outer coating 130 has a Vicker hardness of greater than 500 MPa. In some embodiments, the outer coating 130 has a Vicker hardness of greater than 600 MPa. In some embodiments, the outer coating 130 has a Vicker hardness of greater than 700 MPa. In some embodiments, the outer coating 130 has a Vicker hardness of greater than 800 MPa. In some embodiments, the outer coating 130 has a Vicker hardness of greater than 900 MPa. In some embodiments, the outer coating 130 has a Vicker hardness of greater than 1 GPa. In some embodiments, the outer coating 130 has a Vicker hardness of greater than 5 GPa. In some embodiments, the outer coating 130 has a Vicker hardness of greater than 10 GPa.

The hard outer coating 130 may be formed from or include any material that provides the erosion resistance, or hardness as described herein. In some embodiments, the outer coating 130 may be formed from or include ceramics such as metal oxides (e.g., aluminum oxides, beryllium oxide, cerium oxide, zirconium oxide, etc.), metal carbides (e.g., calcium carbide, silicon carbide, tungsten carbide, iron carbide, aluminum carbide, beryllium carbide, etc.), metal borides (e.g., titanium boride, hafnium boride, zirconium boride, vanadium boride, niobium boride, tantalum boride, chromium boride, molybdenum boride, tungsten boride, iron boride, cobalt boride, niobium boride, etc.), metal nitrides (e.g., silicon nitride, zirconium nitride, tungsten nitride, vanadium nitride, tantalum nitride, niobium nitride, etc.), metal silicides (e.g., chromium silicide, manganese silicide, iron silicide, cobalt silicide, copper silicide, vanadium silicide, magnesium silicide, strontium silicide, calcium silicide, cerium silicide, rhodium silicide iridium silicide, nickel silicide, ruthenium silicide, etc.), a composite ceramic, a fiber reinforced ceramic, any other suitable ceramic material or a combination thereof.

The hard outer coating 130 may be deposited using any suitable method such as, for example, PVD, CVD, MAO, PAO, spray coating, atomic layer deposition (ALD), or any other suitable coating technique. In some embodiments, the outer coating 130 may be a single layer coating that is formulated to optionally have each of a solar absorptivity of less than 0.5 at a wavelength of less than 2.5 microns, optionally a radiative emissivity of greater than 0.5 at a wavelength in a range of 2.5 microns to 15 microns at an operating temperature in a range of 60 degrees Celsius to 250 degrees Celsius, and an erosion resistance that is at least 5% greater than an erosion resistance of aluminum or aluminum alloys (e.g., at least about 5% greater, about 6% greater, about 7% greater, about 8% greater, about 9% greater, about 10% greater, about 11% greater, about 12% greater, about 13% greater, about 14% greater, about 15% greater, about 16% greater, about 17% greater, about 18% greater, about 19% greater, about 20% greater, about 25% greater, about 30% greater, about 35% greater, about 40% greater, about 45% greater, about 50% greater, about 60% greater, about 70% greater, about 80%, about 90% greater, or at least about 100% greater, inclusive).

In other embodiments, the outer coating 130 may include a multilayer coating, with each layer of the outer coating 130 providing one or more of the radiative emissivity, the solar absorptivity, and the erosion resistance properties in any suitable combination and disposed in any suitable order on the conductor layer 120. For example, a first layer of the multilayer outer coating 130 may optionally have the solar absorptivity of less than 0.5 at a wavelength of less than 2.5 microns, a second layer of the outer coating 130 may optionally have a radiative emissivity of greater than 0.5 at a wavelength in a range of 2.5 microns to 15 microns at an operating temperature in a range of 60 degrees Celsius to 250 degrees Celsius, and a third layer may have an erosion resistance that is at least 5% greater than an erosion resistance of aluminum or aluminum alloys. In some embodiments, the outer layer of the outer coating 130 may have the erosion resistance that is at least 5% greater than an erosion resistance of aluminum or aluminum alloys.

Figure 2:
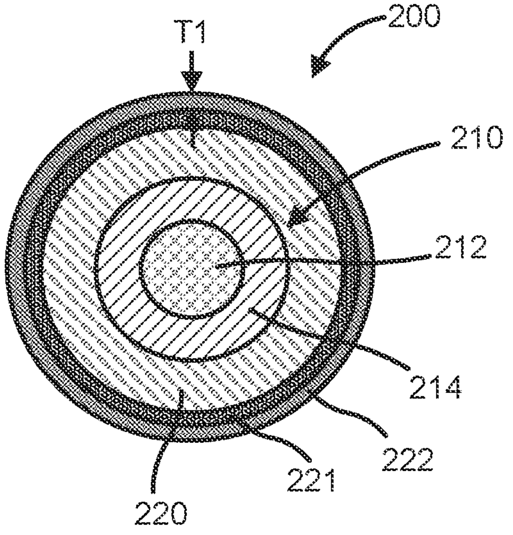
FIG. 2 is a side cross-section view of a conductor including an outer coating, according to an embodiment.

FIG. 2 is a side cross-section view of a conductor 200 including an outer coating 230, according to an embodiment. The conductor 200 is includes a strength member 210, a conductor layer 220, and an outer coating 230, and may optionally, also include an insulating layer 222 disposed between the conductor layer 220 and the outer coating 230. The conductor 100 may be used in grid transmission applications to conduct electricity.

The strength member 210 includes a core 212 and an encapsulation layer 214 disposed circumferentially around the core 212. The core 212 may be formed from a composite material. In some embodiments, the composite material may include nonmetallic fiber reinforced metal matrix composite, carbon fiber reinforced composite of either thermoplastic or thermoset matrix, or composites reinforced with other types of fibers such as quartz, AR-Glass, E-Glass, S-Glass, H-Glass, silicon carbide, silicon nitride, alumina, basalt fibers, especially formulated silica fibers, any other suitable composite material, or any combination thereof. In some embodiments, the composite material may include a carbon fiber reinforced composite of a thermoplastic or thermoset resin. The reinforcement in the composite strength member 212 can be discontinuous such as whiskers or chopped fibers; or continuous fibers in substantially aligned configurations (e.g., parallel to axial direction) or randomly dispersed (including helically wind or woven configurations). In some embodiments, the composite material may include a continuous or discontinuous polymeric matrix composites reinforced by carbon fibers, glass fibers, quartz, or other reinforcement materials, and may further include fillers or additives (e.g., nanoadditives). In some embodiments, the core 212 may include a carbon composite including a polymeric matrix of epoxy resin cured with anhydride hardeners. In some embodiments, the core 212 may be include any material as described with respect to the core 112.

As shown in FIG. 2, the core 212 is has a substantially circular cross-section, but may have any other suitable shape, as described with respect to the core 212. In some embodiments, the core 212 may have a diameter in a range of about 2 mm to about 15 mm, inclusive (e.g., 2, 3, 4, 5, 6, 7, 8, 9, 10, 11, 12, 13, 14, or 15 mm, inclusive). In some embodiments, the core 212 may have a glass transition temperature or melting point of at least about 70 degrees Celsius (e.g., at least 75, at least 80, at least 90, at least 100, at least 120, at least 140, at least 150, at least 160, at least 180, at least 200, at least 220, at least 240, or at least 250, degrees Celsius, inclusive), as previously described with respect to the core 212. While FIG. 2 shows the core 212 as being solid, in some embodiments, the core 212 may be hollow, as described with respect to the core 112. Sensing or transmission components may be embedded within the void or channels defined in the core 212. For example, in some embodiments, sensors such as strain gages, accelerometers, or optical fiber sensors may be disposed within, or extend through the core 212, as described herein. In some embodiments, the optical fibers may extend through the core 212 may include communication optical fibers, as described herein.

The encapsulation layer 214 is disposed circumferentially around the core 212. The encapsulation layer 214 may be formed from any suitable electrically conductive or non-conductive material. In some embodiments, the encapsulation layer 214 may be formed from a conductive material including, but not limited to aluminum (e.g., 1350-H19), annealed aluminum (e.g., 1350-0), aluminum alloys (e.g., Al—Zr alloys, 6000 series Al alloys such 6201-TSl, -T82, -T83, 7000 series Al alloys, 8000 series Al alloys, etc.), copper, copper alloys (e.g., copper magnesium alloys, copper tin alloys, copper micro-alloys, etc.), any other suitable conductive material, or any combination thereof, as described with respect to the encapsulation layer 114.

The encapsulation layer 214 may be disposed on the core 212 using any suitable process. In some embodiments, the encapsulation process for disposing the encapsulation layer 214 around the core 214 includes using a conforming machine or stranding machine, or any other suitable process as described with respect to the encapsulation layer 214. While FIG. 2 shows a single encapsulation layer 214 disposed around the core 212, in some embodiments, multiple encapsulation layers 214 may be disposed around the core 212. In such embodiments, each of the multiple encapsulation layers 214 may be substantially similar to each other, or may be different from each other (e.g., formed from different materials, have different thicknesses, have different tensile strengths, etc.).

In some embodiments, the interface between the core 212 and the encapsulation layer 214 may include surface features, for example, grooves, slots, notches, indents, detents, etc. to enhance adhesion, bonding and/or interfacial locking between a radially outer surface of the core 212 and a radially inner surface of the encapsulation layer 214. Such surface features may facilitate retention and preservation of the stress from optional pretensioning in the encapsulation layer 214. In some embodiments, the composite core 212 may have a glass fiber tow disposed around its outer surface to create a screw shape or twisted surface. In some embodiments, a braided or woven fiber layer is applied in the outer layer of the core 212 to promote interlocking or bonding between the core 212 and the encapsulation layer 214.

In some embodiments, the encapsulation layer 214 may have a thickness in a range of about 0.25 mm to about 5 mm, inclusive, or even higher (e.g., 0.25, 0.3, 0.5, 1, 1.5, 2.0, 2.5, 3.0, 3.5, 4.0, 4.5, 5.0 mm, inclusive, or even higher). In some embodiments, a ratio of an outer diameter of the encapsulation layer 214 to an outer diameter of the core 212 is in range of about 1.2:1 to about 5:1, inclusive (e.g., 1.2:1, 1.5:1, 2:1, 2.5:1, 3:1, 3.5:1, 4:1, 4.5:1, or 5:1, inclusive).

In some embodiment, the strength member 210 may have a minimum level of tensile strength, for example, at least 600 MPa (e.g., at least 600, at least 700, at least 800, at least 1,000, at least 1,200, at least 1,400, at least 1,600, at least 1,800, or at least 2,000 MPa, inclusive). In some embodiments, the elongation during pretension of the strength member 210 may include elongation by at least 0.005% strain (e.g., at least 0.005%, at least 0.01%, at least 0.1%, at least 0.2%, at least 0.25%, at least 0.3%, at least 0.35%, at least 0.4%, at least 0.45%, or at least 0.5% strain, inclusive) depending on the type of strength members and the degree of knee point reduction, and the strength member 210 may be pre-tensioned before or after entering the conforming machine. Moreover, the strength member 210 may be configured to endure radial compression from crimping of conventional fittings as well as radial pressure during conforming of drawing down process or folding and molding of at least 3 kN (e.g., at least 3 kN, at least 4 kN, at least 5 kN, at least 10 kN, at least 15 kN, at least 20 kN, or at least 25 kN, inclusive).

In some embodiments, the encapsulation layer 214 may have an outer surface that is smooth and shiny so as to maximize refractivity and reduce absorptivity (i.e., enhance reflectivity) for reducing an operating temperature of the core 212 and preventing the temperature of the core from exceeding its glass transition temperature or melting point. As described in further detail herein, the outer coating 230 may be formulated to have a high radiative emissivity in the 2.5 microns to 15 microns wavelength, inclusive, of the solar radiation. While this may cause cooling of the conductor layer 220, the radiated heat will also travel towards the strength member 210 and cause heating of the core 212, for example, cause the core 212 to be at a higher operating temperature than the conductor layer 220, which is undesirable. In some embodiments in which there is no stranded layer of conductive materials around the encapsulation layer 214, the outer surface of the encapsulation layer 214 (e.g., an inner coating 216 disposed thereon) may be configured for high radiative emissivity to remove heat from conductor 200 through thermal radiation.

To reduce absorption of this emitted radiation, the outer surface of the encapsulation layer 214 may be sufficiently reflective so as to have absorptivity of less than 0.5 (e.g., less than 0.5, less than 0.4, less than 0.3, less than 0.2, or less than 0.1) at a wavelength in a range of 2.5 microns to 15 microns, inclusive (e.g., 2.5, 3.0, 3.5, 4.0, 4.5, 5.0, 5.5, 6.0, 6.5, 7.0, 7.5, 8.0, 8.5, 9.0, 9.5, 10.0, 11.0, 12.0, 13.0, 14.0, or 15.0 microns, inclusive), at an operating temperature of the conductor 200 in a range of 90 degrees Celsius to 250 degrees Celsius, inclusive (e.g., 90, 100, 120, 140, 160, 180, 200, 220, 240, or 250 degrees Celsius, inclusive). In some embodiments, the outer surface of the encapsulation layer 214 may be surface treated (e.g., plasma treated, texturized, etc.) to have the absorptivity as described above. As previously described, the highly reflective encapsulation layer 214 having low heat absorptivity may facilitate lowering an operating temperature of core 212, therefore protecting the core 212 and allowing the conductor 200 to operate at a higher temperature relative to the core 212 so as to inhibit the temperature of the core 212 from exceeding a threshold temperature (e.g., its glass transition temperature or melting point). In some embodiments, an outer surface of the encapsulation layer 214 is configured to have a reflectivity of greater than 50% at thermal radiative wavelengths corresponding to an operating temperature of greater than 90 degrees Celsius, or a reflectivity as described with respect to the encapsulation layer 114.

The conductor layer 220 is disposed around the strength member 210 and configured to transmit electrical signals therethrough at an operating temperature in a range of about 60 degrees to about 250 degrees Celsius, inclusive. In some embodiments, the conductor layer 220 may include a plurality of strands of a conductive material disposed around the strength member 210, as described with respect to the conductor layer 220. In some embodiments, the conductor layer 220 (e.g., a plurality of strands of conductive material) may include, for example, aluminum, aluminum alloy, copper or copper alloy including micro alloy as conductive media, etc. In some embodiments, the conductor layer 220 may include conductive strands including Z, C, or S wires to keep the outer strands in place. The conductor layer 220 may have any suitable cross-sectional shape, for example, circular, triangular, trapezoidal, etc. In some embodiments, the conductor layer 220 may include stranded aluminum layer that may be round or trapezoidal. In some embodiments, the conductor layer 220 may include Z shaped aluminum strands. In some embodiments, the conductor layer 220 may include S shaped aluminum strands. In various embodiments, the conductor layer 220 may be formed from any suitable material, as described with respect to the conductor layer 120.

In some embodiments, the strands of the conductive material of the conductor layer 220 may be formed using a conforming machine, for example, by extruding hot, deformable (e.g., semi solid) conductive material (e.g., aluminum) from a mold. The strands can be molded to be round or trapezoidal. In some embodiments, the conductive media may be extruded out of the mold or die at an angle so as to form conductive strands that wrap around the strength member 210 at an angle, as described herein. In some embodiments, the conductor layer 220 may include a plurality of layers of conductive strands disposed concentrically around the strength member 210. In some embodiments, the conductor layer 220 may be optionally stranded to facilitate conductor spooling around a reasonably sized spool and facilitate conductor stringing. In some embodiments, the outer most strands included in the conductor layer 120 may be TW, C, Z, S, or round strands, as previously described.

In some embodiments, the conductor 200 may be prestressed, as previously described with respect to the conductor 100. In some embodiments, the conductor layer 220 (e.g., each strand of conductive material included in the conductor layer 220) may include aluminum having electrical conductivity of at least 50% ICAS, at least 55% ICAS, at least 60% ICAS, or at least 65% ICAS, or may include copper having electrical conductivity of at least 65% ICAS, at least 75% ICAS, or even at least 95% ICAS. In some embodiments, metallurgical bonding may be provided between the strength member 210 and the conductor layer 220, for example, via an adhesive. In some embodiments, the conductor layer 220 may include aluminum, aluminum alloy, copper and copper alloys, lead, tin, indium tin oxide, silver, gold, nonmetallic materials with conductive particles, any other conductive material, conductive alloy, or conductive composite, or combination thereof. In some embodiments, the conductor layer 220 may include any of the conductor layers as described in detail with respect to the conductor layer 120. In some embodiments, a skin depth of the conductive strands included in the conductor layer 220 may be in a range of 6 mm to about 12 mm, inclusive at 60 Hz (e.g., 6, 7, 8, 9, 10, 11, or 12 mm, inclusive), or in a range of about 12 mm to about 20 mm, inclusive at 25 Hz (e.g., 12, 13, 14, or 15 mm, inclusive) for pure copper. For pure aluminum, the skin depth may be in a range of about 9 mm to about 14 mm, inclusive at 25 Hz (e.g., 9, 10, 11, 12, 13, or 14 mm, inclusive) and in a range of about 14 mm to about 20 mm at 60 Hz (e.g., 14, 15, 16, 17, 18, 19, or 20 mm, inclusive). In some embodiments, each of the conductive strands included in the conductor layer 120 may include copper having a thickness of up to 12 mm (e.g., up to 12, up to 11, up to 10, up to 9, or up to 8 mm, inclusive). In some embodiments, each of the conductive strands included in the conductor layer 220 may include aluminum having a thickness of up to 16 mm (e.g., up to 16, up to 14, up to 13, up to 12, up to 11, or up to 10 mm, inclusive). In some embodiments, a dielectric coating may be interposed between the conductive strands to optimize for the skin effect. In some embodiments, lubricants may be provided between adjacent conductive strands to facilitate some relative motion of the conductive strands included in the conductor layer 220.

In some embodiments, an insulating layer 222 (e.g., a jacket) may be disposed around the conductor layer 220, as shown in FIG. 2. The insulating layer 222 may be formed from any suitable electrically insulative material, for example, rubber, plastics, or polymers (e.g., polyethylene, high density polyethylene, cross-linked high density polyethylene, PTFE, etc.). The insulating layer 222 may be configured to electrically isolate or shield the conductor 200. In some embodiments, the insulating layer 222 may be excluded.

The outer coating 230 is disposed on an outer surface of the conductor layer 220, for example, around individual strands that form the conductor layer 220, or only on outer surface of the outer most conductive strands of the conductor layer 220. The outer coating 230 may be formulated to have a solar absorptivity of less than 0.5 (e.g., 0.49, 0.45, 0.40, 0.35, 0.30, 0.25, 0.20, 0.15, 0.1, inclusive or even lower) at a wavelength of less than 2.5 microns, and a radiative emissivity of greater than 0.5 (e.g., 0.51, 0.55, 0.60, 0.65, 0.70, 0.75, 0.80, 0.85, 0.90, 0.95, inclusive, or even higher) at a wavelength in a range of 2.5 microns to 15 microns, inclusive at an operating temperature in a range of 60 degrees Celsius to 250 degrees Celsius, inclusive. For example, the outer coating 230 may be formulated to have a radiative emissivity of equal to or greater than 0.75 (e.g., 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, inclusive, or even higher) at a wavelength of about 6 microns, and a solar absorptivity of less than 0.3 (e.g., 0.29, 0.28, 0.27, 0.26, 0.25, 0.24, 0.23, 0.22, 0.21, 0.20, 0.15, 0.10, inclusive, or even lower) at a wavelength of less than 2.5 microns at an operating temperature of about 200 degrees Celsius.

The low solar absorptivity of the outer coating 230 at a wavelength of less than 2.5 microns causes the outer coating 230 to reflect a substantial amount of solar radiation (e.g., greater than 50%, greater than 60%, greater than 70%, greater than 80%, greater than 90%, or even greater than 95%, inclusive, of the incident solar radiation) in the wavelength of less than 2.5 microns, thus reducing solar absorption and inhibiting increase in operating temperature of conductor 200. Moreover, the high radiative emissivity of the outer coating 230 at the wavelength in a range of 2.5 microns to 15 microns causes the outer coating 230 to emit heat being generated by the conductor 200 due to passage of current therethrough as photons, thus increasing radiation of heat away from the conductor 200 into the environment, further reducing the operating temperature of the conductor 200. In some embodiments, the outer coating 230 may cause a reduction in operating temperature of the conductor 200 at a particular current in a range of about 5 degrees Celsius to about 40 degrees Celsius, inclusive (e.g., 5, 6, 7, 8, 9, 10, 12, 14, 16, 18, 20, 25, 30, 35, or 40 degrees Celsius, inclusive), as described herein.

In some embodiments, the unique properties of the outer coating 230 may be caused by including microstructures and nanoporosities in the outer coating 230. For example, the outer coating 230 may include microstructures having a size in a range of 3 microns to 15 microns, inclusive (e.g., 3, 4, 5, 6, 7, 8, 9, 10, 11, 12, 13, 14, or 15 microns, inclusive), which are configured to cause the coating to have the radiative emissivity of greater than 0.5 (e.g., greater than 0.7, 0.7, 0.8, 0.9, or 095, inclusive), as previously described. In some embodiments, the microstructures may include micropores or voids that may be inherently present in the outer coating 230 or introduced during manufacturing operation of the outer coating 230 (e.g., a ball milling operation).

In some embodiments, the microstructures may include inorganic particles. For example, the microstructures may include metal oxides, metal nitrides, metal fluorides, metal carbides, metal carbonates, and/or rare earth elements. In some embodiments, the microstructures include $CaCO_3$, for example, solid particles, hollow particles, and/or core-shell particles. In some embodiments, the microstructures may include silica (e.g., porous silica or randomly distributed $SiO_2$ spheres in a polymer matrix). In some embodiments, the microstructure may include $Al_2O_3$ (e.g., porous alumina) particles, $BaSO_4$ particles, or wide bandgap pigments. In some embodiments, the microstructures may include core-shell particles, and/or wide bandgap and multi-scaled particles, that promote reflection of incident sunlight, while having vibration modes that that provide radiative emissivity in the 2.5 microns to 15 microns range, as described herein. In some embodiments, the microstructure may include gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, titanium dioxide, aluminum nitride, boron nitride, alumina, magnesium oxide, calcium oxide, any other suitable material, or combinations thereof.

The outer coating 230 also includes nanoporosities, nanovoids, or nanoholes having a size in a range of about 30 nm to about 700 nm, inclusive (e.g., 30, 40, 50, 60, 70, 80, 90, 100, 120, 140, 160, 180, 200, 25, 300, 350, 400, 450, 500, 550, 600, 650 or 700 nm, inclusive), which are configured to cause the outer coating 230 to have the solar absorptivity in the range of less than 0.5 (e.g., less than 0.5, 0.4, 0.3, 0.2, or 0.1, inclusive). In some embodiments, the outer coating 230 may include a fluoropolymer and/or polyurethane. In some embodiments, the fluoropolymer may include PVDF-HFP polymer, and/or PVDF-HFP copolymers, or any other suitable material formed using any suitable method as described in detail with respect to the outer coating 130.

In some embodiments, the outer coating 230 may include TEFLON®, PTFE, or any other dielectric. In some embodiments, the outer coating 230 may include nanocellulose fibers. In some embodiments, the microstructure may include $TiO_2$ that has high emissivity to provide the high radiative emissivity of the outer coating 230, and the nanoporosities included in the outer coating 230 may provide the low solar absorptivity. In some embodiments, the outer coating 230 may also include colors or dyes (e.g., fluorescent dies), to provide limited near-infrared and short wavelength infrared absorption.

In some embodiments, the outer coating 230 may have a thickness T1 in a range of about 50 micron to about 500 micron, inclusive (e.g., 50, 60, 70, 80, 90, 100, 120, 140, 160, 180, 200, 220, 240, 260, 280, 300, 320, 340, 360, 380, 400, 420, 440, 460, 480, or 500 micron, inclusive). In some embodiments, a base coat, varnish, or adhesive may be applied on an outer surface of the conductor layer 220 (e.g., on each of the conductive strands forming the conductor layer 220, only on the outer most conductive strands forming the conductor layer 220, or on an outer surface of the insulating layer 222) before applying the outer coating 230 thereon. In some embodiments, the base coat and/or the outer coating 230 may be hydrophobic, for example, to inhibit ice formation, inhibit fouling, protect against UV radiation, and inhibit water born dirt. In some embodiments, an outer surface of at least a portion of the conductive strands forming the conductor layer 220 may be cleaned, for example, using surfactants or solvents to provide a clean surface before depositing the outer coating 230 thereon. In some embodiments, the outer surface of the conductor layer 220 (e.g., each of the strands forming the conductor layer 220, the outer most strands, or an outer surface of the outer most strands) or the insulating layer 222 may be roughened by sand blasting to provide a rough surface to facilitate adhesion of the outer coating 230 thereto.

In some embodiments, the outer coating 230 may be hydrophilic, for example, to minimize corona in EHV and UHV applications where the circuit voltage is higher than 200 kV (e.g., a typical Corona excitation onset voltage). Such hydrophilic outer coatings 130 may include, but are not limited to polyethyelene glycol, hydrogels (e.g., silica hydrogels), silica, silicon dioxide, titanium dioxide, polyvinyl alcohol, any other suitable hydrophilic coating, or any suitable combination thereof.

In some embodiments, the outer coating 230 may include a paint, for example, black paint such as a polyurethane paint, having a resin matrix and may, optionally, include ceramic particles. In some embodiments, the outer coating 230 may include about 50% to about 99%, inclusive, by dry weight, of a suitable fluoro-copolymer compound (e.g., about 75% to about 95%, inclusive by dry weight). In some embodiments, the outer coating 230 may include polymers cross-linked through any suitable method including, for example, moisture, chemical, heat, UV, and e-beam curing methods. Cross-linking agents can include, but are not limited to, cross-linking agents that are reactive to hydroxyls, acids, epoxides, amines, cyanate including monomers, or oligomers or polymers which have urethane, fluorine, silane, fluoro silane, fluoro silicones, silsesquioxanes, polytetrafluoroethylene ("PTFE"), epoxy, phenolic, ether, silicone, or acrylic groups in back bones or grafted, either alone or in combination with other functional groups, in liquid, semi-solid, or powdered forms. Suitable chemical cross-linking agents (e.g., reactive agents) can include a monomeric or oligomeric polymeric resin that, when mixed with a cross-linkable fluoro-copolymer, can promote curing of the composition. In some embodiments, the cross-linking agents may include acrylates, fluoro silanes, fluoro silicones, methacrylic esters, silanes (including methoxy silanes and epoxy silanes) metal catalysts, triallyl isocyanurate ("TAIC"), peroxides, or combinations thereof. In some embodiments, the fluoro copolymer can have, for example, hydroxyl groups that can be cross-linked with a polyisocyanate cross-linking agent such as hexamethylene-6,6-diisocyanate ("HDI"). Such HDI agents can be either aromatic or aliphatic based. In certain embodiments, a catalyst can additionally be included to accelerate the cross-linking reaction. Suitable cross-linking agents can be included, by dry weight, at about 1% to about 20%, inclusive, of the outer coating 230.

In some embodiments, the outer coating 230 may include additional components such as, for example, one or more fillers (e.g., microstructures), solvents, defoamers, emulsifiers, thickeners, UV and light stabilizers, or resins. In some embodiments, the outer coating 230 may include metal oxides, metal nitrides, metal fluorides, rare earth elements, and metal carbides such as, but not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide ("silica"), chromium oxides, iron oxide, boron carbide, boron silicide, copper chromium oxide, titanium dioxide, aluminum nitride, boron nitride, alumina, $HfO_2$, and combinations thereof.

In some embodiments, suitable rare earth materials may include one, or more, of a rare earth oxide, a rare earth carbide, a rare earth nitride, a rare earth fluoride, or a rare earth boride. Examples of rare earth oxides include scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide. Examples of rare earth carbides include, but are not limited to, scandium carbide, yttrium carbide, cerium carbide, praseodymium carbide, neodymium carbide, samarium carbide, europium carbide, gadolinium carbide, terbium carbide, dysprosium carbide, holmium carbide, erbium carbide, thulium carbide, ytterbium carbide, and lutetium carbide. Examples of rare earth fluorides include, but are not limited to, scandium fluoride, yttrium fluoride, cerium fluoride, praseodymium fluoride, neodymium fluoride, samarium fluoride, europium fluoride, gadolinium fluoride, terbium fluoride, dysprosium fluoride, holmium fluoride, erbium fluoride, thulium fluoride, ytterbium fluoride, and lutetium fluoride. Examples of rare earth borides include, but are not limited to, scandium boride, yttrium boride, lanthanum boride, cerium boride, praseodymium boride, neodymium boride, samarium boride, europium boride, gadolinium boride, terbium boride, dysprosium boride, holmium boride, erbium boride, thulium boride, ytterbium boride, and lutetium boride.

In some embodiments, the filler can also include electrically conductive fillers including carbon nanotubes, graphene, and graphite. In some embodiments, the filler can have an average particle size of about 25 microns or less (e.g., about 10 microns or less, or about 500 nanometers or less). Suitable fillers can optionally be included in the coating at less than about 50% by weight (e.g., in a range of about 2% to about 30% by weight, inclusive, or about 5% to about 20% by weight, inclusive). In some embodiments, the outer coating 230 may include a defoamer, for example, to inhibit or retard the formation of foam (e.g., when water is added to the heat-resistant coating composition). Suitable examples of defoamers can include silicon-based antifoam agents and non-silicon-based antifoam agents. In some embodiments, a surfactant can also be used as a defoamer. Suitable surfactants include, but are not limited to, cationic, anionic, or non-ionic surfactants, and fatty acid salts. In some embodiments, the defoamer may include about 0.1% to about 5% by weight, inclusive, of the outer coating 230.

In some embodiments, the outer coating 230 may include an emulsifier, for example, to maintain an even dispersion of compounds in a water solution. Suitable emulsifiers can include, but are not limited to, sodium lauryl sulfate, sodium dodecyl phenylsulfonate, potassium stearate, sodium dioctyl sulfosuccinate, dodecyl diphenyloxy disulfonate, ammonium nonyl phenoxyethyl poly(1)ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium α-olefin ($C_{14}$-$C_{16}$) sulfonate, hydroxyl alkanol sulfate, tetra sodium N-(1,2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate. The emulsifier can be included in the outer coating 230 in a range of about 2% to about 3% by weight, inclusive, of the outer coating 230.

In some embodiments, coalescent agents or thickeners can be added to improve the formation of a film on the outer coating 230. In such embodiments, a coalescing agent can be included at about 20% or less by weight of a coating composition (e.g., in a range of about 2% to about 10% by weight, inclusive). In certain embodiments, UV or light stabilizers can be added to the outer coating 230 to improve the exterior weather ability. Suitable UV or light stabilizers can include benzotriazole-type, triazine-type UV absorbers, and HALS compounds. The UV or light stabilizer can be included at about 0.1% to about 5%, by weight, inclusive, in the outer coating 230. Additional resins can be included in the outer coating 230 to improve the performance of the outer coating 230. For example, one, or more, acrylics, silicones, urethanes, silanes, fluoro silanes, silsesquioxanes, or epoxies can be added to the outer coating 230. Alternatively, or additionally, commercial lubricants, waxes, and friction reducers can be added to the coating composition. Such resins can improve various properties of the composition including, for example, processability, durability, and service life of the coating. Suitable resins can be included in the coating composition at about 0.1% to about 40% by weight, inclusive.

In some embodiments, one or more binders may be included in the outer coating 230, for example, in a range of about 10% to about 70%, inclusive, by weight of the total dry composition of the outer coating 230 (e.g., about 10% to about 20%, about 20% about 30%, about 30% to about 40%, about 40% to about 50%, about 50% to about 60%, or about 60% to about 70%, inclusive). The binder may include a functional group, such as hydroxyl, epoxy, amine, acid, cyanate, silicate, silicate ester, ether, carbonate, maleic, methyltrimethoxysilane, etc. Inorganic binders can be, but are not limited to, metal silicates, such as potassium silicate, sodium silicate, lithium silicate and magnesium aluminum silicate, peptized aluminum oxide monohydrate; colloidal silica; colloidal alumina, aluminum phosphate and combinations thereof.

In some embodiments, one or more reflective additives may also be included in the outer coating 230. Such reflective additives may include, but are not limited to, cobalt, aluminum, bismuth, lanthanum, lithium, magnesium, neodymium, niobium, vanadium, ferrous, chromium, zinc, titanium, manganese, and nickel-based metal oxides and ceramics. The reflective additives may be included at a concentration of about 0.1% to about 5%, inclusive (by weight of the total dry composition) either individually or mixed with colorants. In some embodiments, one or more stabilizers may be included in the outer coating 230, for example, at a concentration of about 0.1% to about 2%, inclusive (by weight of the total dry composition). Examples of stabilizers include, but are not limited to, dispersion stabilizer, such as bentonites.

In some embodiments, one or more colorants may be included in the outer coating 230, for example, at a concentration of about 0.02% to about 0.2%, inclusive (by weight of the total dry composition). The colorant can be organic or inorganic pigments, which includes, but are not limited to, titanium dioxide, rutile, titanium, anatine, brookite, cadmium yellow, cadmium red, cadmium green, orange cobalt, cobalt blue, cerulean blue, aureolin, cobalt yellow, copper pigments, azurite, Han purple. Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zinc ferrite), and combinations thereof. In some embodiments, the outer coating 230 may include less than about 5% of organic material. For example, the coating composition may include sodium silicate, aluminum nitride, and an amino functional siloxane (silicone modified to include amino functional group(s)). In some embodiments, the amino functional siloxane may include amino dimethylpolysiloxane.

The outer coating 230 may be applied in the form of a paint or slurry using any suitable method, for example, painting, dipping, spraying, evaporation, deposition follow by curing or cross-linking, or shrink wrapping. In some embodiments, the outer surface of the conductor layer 220 (e.g., at least the outer most conductive strands included in the conductor layer 220) may be cleaned, for example, to remove oil, grease, lubricants, dirt etc., that may have deposited on the conductive strands during manufacturing of the conductive strands. The outer surface of the conductive strands of the conductor layer 220 may be cleaned using any suitable method such as, for example, via acid, solvents, or using mechanical means (e.g., sand blasted) to facilitate adhesion of the outer coating 230 to the outer surface of the conductor layer 220. In some embodiments in which the insulating layer 222 is disposed around the conductor layer 220, the outer surface of the insulating layer 222 may be cleaned or texturized (e.g., via sand blasting) before depositing the outer coating 230 thereon. The deposited outer coating 230 may be dried using hot air, or naturally dried. In some embodiments, the outer surface of the conductor layer 220 may be treated or otherwise configured to have a absorptivity of less than 50% corresponding to an operating temperature of greater than 90 degrees, as described with respect to the conductor layer 120.

In some embodiments, additionally or alternatively to the radiative and emissive properties described herein, the outer coating 230 may be a hard coating configured to have a hardness, cutting resistance, or erosion resistance that is at least 5% greater than a hardness, cutting resistance, or erosion resistance of aluminum or aluminum alloys. In this manner, the outer coating 230 may advantageously protect the conductor layer 220 (e.g., each of a plurality of conductive strands of the conductor layer 220) from erosion, cutting, or otherwise mechanical damage (e.g., from accidental cutting by kite strings).

In some embodiments, the outer coating 230 may have an erosion resistance that is at least 5% greater than an erosion resistance of aluminum or aluminum alloys. In some embodiments, the outer coating 230 may have an erosion resistance that is at least 10% greater than an erosion resistance of aluminum or aluminum alloys. In some embodiments, the outer coating 230 may have an erosion resistance that is at least 15% greater than an erosion resistance of aluminum or aluminum alloys. In some embodiments, the outer coating 230 may have an erosion resistance that is at least 20% greater than an erosion resistance of aluminum or aluminum alloys. In some embodiments, the outer coating 230 may have an erosion resistance that is at least 25% greater than an erosion resistance of aluminum or aluminum alloys. In some embodiments, the outer coating 230 may have an erosion resistance that is at least 30% greater than an erosion resistance of aluminum or aluminum alloys. In some embodiments, the outer coating 230 may have an erosion resistance that is at least 40% greater than an erosion resistance of aluminum or aluminum alloys. In some embodiments, the outer coating 230 may have an erosion resistance that is at least 50% greater than an erosion resistance of aluminum or aluminum alloys. In some embodiments, the outer coating 230 may have an erosion resistance that is at least 60% greater than an erosion resistance of aluminum or aluminum alloys. In some embodiments, the outer coating 230 may have an erosion resistance that is at least 70% greater than an erosion resistance of aluminum or aluminum alloys. In some embodiments, the outer coating 230 may have an erosion resistance that is at least 80% greater than an erosion resistance of aluminum or aluminum alloys. In some embodiments, the outer coating 230 may have an erosion resistance that is at least 90% greater than an erosion resistance of aluminum or aluminum alloys. In some embodiments, the outer coating 230 may have an erosion resistance that is at least 100% greater than an erosion resistance of aluminum or aluminum alloys.

In some embodiments, the outer coating 230 has a Vicker hardness of greater than 175 MPa. In some embodiments, the outer coating 230 has a Vicker hardness of greater than 250 MPa. In some embodiments, the outer coating 230 has a Vicker hardness of greater than 250 MPa. In some embodiments, the outer coating 230 has a Vicker hardness of greater than 300 MPa. In some embodiments, the outer coating 230 has a Vicker hardness of greater than 400 MPa. In some embodiments, the outer coating 230 has a Vicker hardness of greater than 500 MPa. In some embodiments, the outer coating 230 has a Vicker hardness of greater than 600 MPa. In some embodiments, the outer coating 230 has a Vicker hardness of greater than 700 MPa. In some embodiments, the outer coating 230 has a Vicker hardness of greater than 800 MPa. In some embodiments, the outer coating 230 has a Vicker hardness of greater than 900 MPa. In some embodiments, the outer coating 230 has a Vicker hardness of greater than 1 GPa. In some embodiments, the outer coating 230 has a Vicker hardness of greater than 5 GPa. In some embodiments, the outer coating 230 has a Vicker hardness of greater than 10 GPa.

The hard outer coating 230 may be formed from or include any material that provides the erosion resistance, or hardness as described herein. In some embodiments, the outer coating 230 may be formed from or include ceramics such as metal oxides (e.g., aluminum oxides, beryllium oxide, cerium oxide, zirconium oxide, etc), metal carbides (e.g., calcium carbide, silicon carbide, tungsten carbide, iron carbide, aluminum carbide, beryllium carbide, etc.), metal borides (e.g., titanium boride, hafnium boride, zirconium boride, vanadium boride, niobium boride, tantalum boride, chromium boride, molybdenum boride, tungsten boride, iron boride, cobalt boride, niobium boride, etc.), metal nitrides (e.g., silicon nitride, zirconium nitride, tungsten nitride, vanadium nitride, tantalum nitride, niobium nitride, etc.), metal silicides (e.g., chromium silicide, manganese silicide, iron silicide, cobalt silicide, copper silicide, vanadium silicide, magnesium silicide, strontium silicide, calcium silicide, cerium silicide, rhodium silicide iridium silicide, nickel silicide, ruthenium silicide, etc.), a composite ceramic, a fiber reinforced ceramic, any other suitable ceramic material or a combination thereof.

The hard outer coating 230 may be deposited using any suitable method such as, for example, PVD, CVD, MAO, PAO, spray coating, ALD, or any other suitable coating technique. In some embodiments, the outer coating 230 may be single layer coating that is formulated to have each of a solar absorptivity of less than 0.5 at a wavelength of less than 2.5 microns, a radiative emissivity of greater than 0.5 at a wavelength in a range of 2.5 microns to 15 microns, inclusive, at an operating temperature in a range of 60 degrees Celsius to 250 degrees Celsius, and an erosion resistance that is at least 5% greater than an erosion resistance of aluminum or aluminum alloys. In other embodiments, the outer coating 230 may include a multilayer coating, with each layer of the outer coating 230 providing one or more of the radiative emissivity, the solar absorptivity, and the erosion resistance properties in any suitable combination and disposed in any suitable order on the conductor layer 220. For example, a first layer of the multilayer outer coating 230 may have the solar absorptivity of less than 0.5 at a wavelength of less than 2.5 microns, a second layer of the outer coating 230 may have a radiative emissivity of greater than 0.5 at a wavelength in a range of 2.5 microns to 15 microns and at an operating temperature in a range of 60 degrees Celsius to 250 degrees Celsius, and a third layer of the outer coating 230 may have an erosion resistance that is at least 5% greater than an erosion resistance of aluminum or aluminum alloys. In some embodiments, the outer layer of the outer coating 230 may have the erosion resistance that is at least 5% greater than an erosion resistance of aluminum or aluminum alloys that may be used to form the conductor layer 220. In various embodiments, the erosion resistance of aluminum or aluminum alloys that may be used to form the conductor layer 220 may range from 1 micron per hour to 10 mm per hour, inclusive, and the outer coating 230 may be configured to have an erosion resistance that is at least 5% higher than the aluminum or aluminum alloy used form the conductor layer 220.

Figure 3:
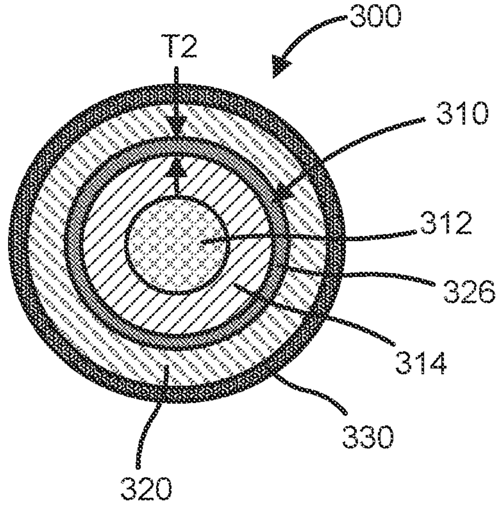
FIG. 3 is a side cross-section view of a conductor including an outer coating and an inner coating, according to an embodiment.

FIG. 3 is a side cross-section view of a conductor 300, according to an embodiment. The conductor 300 is similar to the conductor 200, for example, the conductor 300 includes a strength member 310 including a core 312 and an encapsulation layer 314, that may be substantially similar to the core 112, 212, and the encapsulation layer 114, 214, respectively, as previously described, and therefore not described in further detail herein. The conductor 300 also includes a conductor layer 320 disposed around strength member 310, and having an outer coating 330 disposed around the conductor layer 320. The conductor layer 320 and the outer coating 330, may be substantially similar to the conductor layer 120, 220 and the outer coating 130, 230, previously described, and therefore not described in further detail herein. While not shown, in some embodiments, an insulating layer (e.g., the insulating layer 222) may be interposed between the outer coating 330 and the conductor layer 320, as previously described.

Different from the conductor 200, the conductor 300 also includes an inner coating 316 disposed on an outer surface of the encapsulation layer 314, for example, interposed between the encapsulation layer 314 and the conductor layer 320. In some embodiments, the inner coating 316 may be formulated to have an absorptivity (i.e., heat absorptivity) of less than 0.5 (e.g., less than 0.5, less than 0.4, less than 0.3, less than 0.2, or less than 0.1) at a wavelength in a range of 2.5 microns to 15 microns, inclusive (e.g., 2.5, 3.0, 3.5, 4.0, 4.5, 5.0, 5.5, 6.0, 6.5, 7.0, 7.5, 8.0, 8.5, 9.0, 9.5, 10.0, 11.0, 12.0, 13.0, 14.0, or 15.0 microns, inclusive), at an operating temperature of the conductor 300 in a range of 90 degrees Celsius to 250 degrees Celsius, inclusive (e.g., 90, 100, 120, 140, 160, 180, 200, 220, 240, or 250 degrees Celsius, inclusive). Thus, the inner coating 316 may be configured to reflect a substantial amount of heat radiation incident on the inner coating 316 due to heat generated by the conductor layer 320 in the wavelength of equal to or less than 2.5 microns (e.g., at least 50% of radiation in a wavelength of equal to or less than 2.5 microns that is incident on the encapsulation layer 314). In some embodiments, a thickness of the inner coating 316 may be in a range of 1 micron to 500 microns, inclusive (e.g., 1, 5, 10, 20, 30, 40, 50, 60, 70, 80, 90, 100, 150, 200, 250, 300, 350, 400, 450, or 500 microns, inclusive). Coating on core surface or on the encapsulation layer 314 surface might be thermally non-conductive or have poor thermal conductivity, for example, include ceramics, to minimize conductive heat transfer between the passively heated composite core 312 and the conductive encapsulation layer 314 metal with resistance heating.

In some embodiments, the inner coating 316 may include nanoporosities for example, voids or holes in a size equal to or less than 500 nm (e.g., in a range of 10 nm to 500 nm, inclusive) to cause the inner coating 316 to have the absorptivity of less than 0.5 as described herein. The inner coating 316 may be formed from any suitable material and include any suitable additives to cause the inner coating 316 to have the absorptivity of less than 0.5 microns, as described herein. In some embodiments, the inner coating 316 may include a binder and a reflective agent. In some embodiments, the inner coating 316 may also include fillers, stabilizers, colorants, surfactants, and reflective agents configured to enhance heat reflection in the 2.5 micron to 15 microns range. In some embodiments, the inner coating 316 may include inorganic materials, and may be substantially free of organic materials (e.g., have less than 10% organic material).

In some embodiments, a concentration of a binder in the inner coating 316 may be in a range of 20% to 60%, inclusive. In some embodiments, the binder may include a functional group such as, for example, hydroxyl, epoxy, amine, acid, cyanate, silicate, silicate ester, ether, carbonate, maleic, etc. Inorganic binders may include, but are not limited to, metal silicates, such as potassium silicate, sodium silicate, lithium, silicate and magnesium, aluminum silicate, peptized aluminum oxide monohydrate colloidal silica, colloidal alumina, aluminum phosphate and combinations thereof. In some embodiments, the inner coating 316 may include one or more reflective additives including, but not limited to cobalt, aluminum, bismuth, lanthanum, lithium, magnesium, neodymium, niobium, vanadium, ferrous, chromium, zinc, titanium, manganese, and nickel-based metal oxides and ceramics. In some embodiment, the reflective additives may be used in a concentration in a range of about 0.1% to about 5%, inclusive (by weight of the total dry composition of the inner coating) either individually or mixed with colorants.

In some embodiments, one or more stabilizers may be included in the inner coating 316, for example, at a concentration in a range of about 0.1% to about 2% (by weight of the total dry composition). Examples of stabilizers include, but are not limited to, dispersion stabilizer, such as bentonites. One or more colorants may be used in the inner coating 316, for example, at a concentration in a range of about 0.02% to 0.2%, inclusive (by weight of the total dry composition). The colorant can be organic or inorganic pigments, including, but not limited to, titanium dioxide, rutile, titanium, anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zinc ferrite), and combinations thereof. In some embodiments, one or more surfactants may also be used in the inner coating 316, for example, at a concentration in a range of about 0.05% to about 0.5%, inclusive (by weight of the total dry composition). Suitable surfactants include, but are not limited to, cationic, anionic, or non-ionic surfactants, and fatty acid salts.

In some embodiments, the inner coating 316 may include TEFLON®, polytetrafluoroethylene (PTFE), or polyvinylidene fluoride (PVDF), copolymers, or any suitable combination thereof, which may be formulated as a paint, and may include additives to enhance reflectivity, i.e., reduce absorptivity in the 2.5 micron to 15 microns range. In some embodiments, the inner coating 316 may include polyvinylidene fluoride-co-hexafluoropropylene) (PVDF-HFP) having nanoporosity in a range of 50% or higher causing the inner coating 316 to have the solar absorptivity of less 0.5 at the wavelength in a range of 2.5 microns to 15 microns, inclusive, and at the operating temperature in a range of 60 degrees Celsius to 250 degrees Celsius, inclusive, as previously described herein. In some embodiments, the inner coating 316 may include nanocellulose fibers having a mesoporous structure. In some embodiments, the inner coating 316 may include alumina, $SiO_2$, and porous PTFE.

In some embodiments, the inner coating 316 may include particles, for example, core-shell particles having a wide band-gap configured to reduce absorptivity. Such particles may include particles of inorganic materials such as, for example. $Al_2O_3$, $BaSO_4$, etc. In some embodiments, the inner coating 316 may include PVDF-HFP that may be dissolved in a small amount of a solvent (e.g., acetone), and then water, for example, in a ball milling operation such that the inner coating 316 has nanoporosities in a range of about 10 nm to about 500 nm, inclusive (e.g., 10, 20, 30, 40, 50, 60, 70, 80, 90, 100, 150, 200, 250, 300, 350, 400, 450, or 500 nm, inclusive). In some embodiments, the inner coating 316 may include one or more layers of silicon, ZnO, $HfO_2$, $TiO_2$, $MgF_2$, $Si_3N_4$, $Ta_2O_5$, and/or $ZnO_2$. In some embodiments, the inner coating 316 may include silver.

In some embodiments, a thickness T2 of the inner coating 316 may be in a range of 50 microns to 300 microns, inclusive (e.g., 50, 100, 150, 200, 250, or 300 microns, inclusive). In some embodiments, a ratio of a thickness T1 of the outer coating 330 to the thickness T2 of the inner coating 316 may be in a range of about 1:1 to about 10:1, inclusive (e.g., 1:1, 2:1, 3:1, 4:1, 5:1, 6:1, 7:1, 8:1, 9:1, or 10:1, inclusive).

In some embodiments, a base coat of paint, varnish, or an adhesive may be applied to the outer surface of the encapsulation layer 314 to facilitate adhesion of the inner coating 316 to the encapsulation layer 314. The inner coating 316 may be applied in the form of a paint or slurry using any suitable method, for example, painting, dipping, spraying, evaporation, deposition follow by curing or cross-linking, or shrink wrapping. In some embodiments, the outer surface of the encapsulation layer 314 may be cleaned, for example, via solvents or using mechanical means (e.g., sand blasted) to facilitate adhesion of the inner coating 316 to the outer surface of the encapsulation layer 314. In some embodiments, the inner coating 316 may optionally, be also disposed on an inner surface of the conductor layer 320 (e.g., an inner surface of a portion of conductive strands included in the conductor layer 320 that are disposed proximate to the outer surface of the encapsulation layer 314). In some embodiments, the inner coating 316 may be substantially durable, tough, and/or scratch resistant so as to protect the outer surface of the encapsulation layer 314 from damage, for example, during installation of the conductor layer 320 around the strength member 310.

Figure 4:
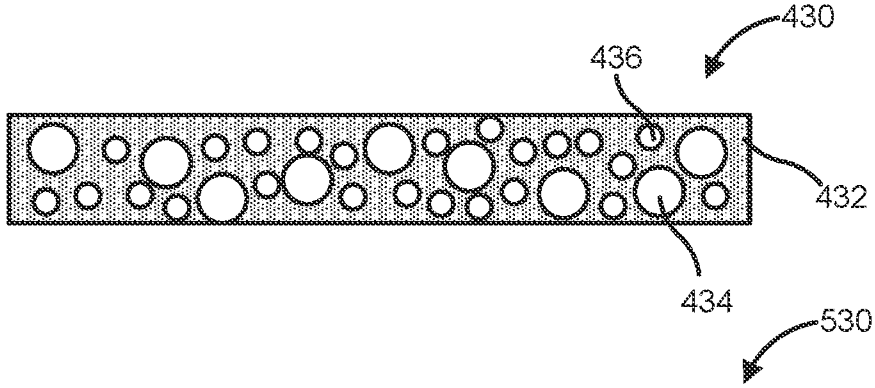
FIG. 4 is a schematic illustration of a coating that has low solar absorptivity and high radiative emissivity for coating on a conductor, according to an embodiment. This coating on a conductor may optionally have high erosion resistance as well.

FIG. 4 is a schematic illustration of a coating 430 that has high refractivity and low solar absorptivity and high radiative emissivity for coating a conductor (e.g., an outer layer of conductor layer 120, 220, 320 of the conductor 100, 200, 300), according to an embodiment. The coating 430 may be formulated to have a solar absorptivity of less than 0.5 (e.g., 0.49, 0.45, 0.40, 0.35, 0.30, 0.25, 0.20, 0.15, 0.1, inclusive or even lower) at a wavelength of less than 2.5 microns, and a radiative emissivity of greater than 0.5 (e.g., 0.51, 0.55, 0.60, 0.65, 0.70, 0.75, 0.80, 0.85, 0.90, 0.95, inclusive, or even higher) at a wavelength in a range of 2.5 microns to 15 microns, inclusive at an operating temperature in a range of 60 degrees Celsius to 250 degrees Celsius, inclusive. For example, the coating 430 may be formulated to have a radiative emissivity of equal to or greater than 0.75 (e.g., 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, inclusive, or even higher) at a wavelength of about 6 microns, and a solar absorptivity of less than 0.3 (e.g., 0.29, 0.28, 0.27, 0.26, 0.25, 0.24, 0.23, 0.22, 0.21, 0.20, 0.15, 0.10, inclusive, or even lower) at a wavelength of less than 2.5 microns at an operating temperature of about 200 degrees Celsius. In some embodiments, the outer coating 430 may cause a reduction in operating temperature of the conductor at a particular current in a range of about 5 degrees Celsius to about 40 degrees Celsius, inclusive (e.g., 5, 6, 7, 8, 9, 10, 12, 14, 16, 18, 20, 25, 30, 35, or 40 degrees Celsius, inclusive), as described herein.

In some embodiments, the coating 430 may include a fluoropolymer and/or polyurethane. In some embodiments, the fluoropolymer may include PVDF-HFP polymer, and/or PVDF-HFP copolymers, or any other suitable material formed using any suitable method as described in detail with respect to the coating 130. In some embodiments, the outer coating 430 may include TEFLON®, PTFE, or any other dielectric. In some embodiments, the outer coating 430 may include nanocellulose fibers. In some embodiments, the outer coating 430 may include a paint, for example, black paint such as a polyurethane paint, having a resin matrix. In some embodiments, the coating 430 may include about 50% to about 99%, inclusive, by dry weight, of a suitable fluoro-copolymer compound (e.g., about 75% to about 95%, inclusive by dry weight). In some embodiments, the coating 430 may include a hydrophilic coating, for example, any of the hydrophilic coating described in detail with respect to the outer coating 130 or 230.

In some embodiments, the coating 430 may include polymers cross-linked through any suitable method including, for example, moisture, chemical, heat, UV, and e-beam curing methods. Cross-linking agents can include, but are not limited to, cross-linking agents that are reactive to hydroxyls, acids, epoxides, amines, cyanate including monomers, or oligomers or polymers which have urethane, fluorine, silane, fluoro silane, fluoro silicones, silsesquioxanes, polytetrafluoroethylene, epoxy, phenolic, ether, silicone, or acrylic groups in back bones or grafted, either alone or in combination with other functional groups, in liquid, semi-solid, or powdered forms. Suitable chemical cross-linking agents (e.g., reactive agents) can include a monomeric or oligomeric polymeric resin that, when mixed with a cross-linkable fluoro-copolymer, can promote curing of the composition.

In some embodiments, the cross-linking agents may include acrylates, fluoro silanes, fluoro silicones, methacrylic esters, silanes (including methoxy silanes and epoxy silanes) metal catalysts, triallyl isocyanurate ("TAIC"), peroxides, or combinations thereof. In some embodiments, the fluoro copolymer can have, for example, hydroxyl groups that can be cross-linked with a polyisocyanate cross-linking agent such as hexamethylene-6,6-diisocyanate ("HDI"). Such HDI agents can be either aromatic or aliphatic based. In certain embodiments, a catalyst can additionally be included to accelerate the cross-linking reaction. Suitable cross-linking agents can be included, by dry weight, at about 1% to about 20%, inclusive of the coating 430.

The coating 430 may include microstructures 432 and nanoporosities 434 disposed or formed throughout the volume of the coating 430. For example, the coating 430 may include microstructures 432 having a size in a range of 3 microns to 15 microns, inclusive (e.g., 3, 4, 5, 6, 7, 8, 9, 10, 11, 12, 13, 14, or 15 microns, inclusive), which are configured to cause the coating to have the radiative emissivity of greater than 0.5 (e.g., greater than 0.7, 0.7, 0.8, 0.9, or 0.95, inclusive), as previously described. In some embodiments, the microstructures 432 may include micropores or voids that may be inherently present in the coating 430 or introduced during manufacturing operation of the outer coating 430 (e.g., a ball milling operation). The tailored microstructures 432 may maximize refractivity for the wavelength of interest, i.e., 6 micron or nearby wavelength in thermal radiation at temperatures, for example, near 200 degrees Celsius.

In some embodiments, the microstructures 432 may include inorganic particles. For example, the microstructures 432 may include metal oxides, metal nitrides, metal fluorides, metal carbides, metal carbonates, and/or rare earth elements, for example, as described with respect to the outer coating 130, 230. In some embodiments, the microstructures 432 may include $CaCO_3$, for example, solid particles, hollow particles, and/or core-shell particles. In some embodiments, the microstructures 432 may include silica (e.g., porous silica or randomly distributed $SiO_2$ spheres in a polymer matrix). In some embodiments, the microstructures 432 may include $Al_2O_3$ (e.g., porous alumina) particles, $BaSO_4$ particles, or wide bandgap pigments. In some embodiments, the microstructures 432 may include core-shell particles, and/or wide bandgap and multi-scaled particles, that promote reflection of incident sunlight, while having vibration modes that provide radiative emissivity in the 2.5 microns to 15 microns range, as described herein. In some embodiments, the microstructures 432 may include gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, titanium dioxide, aluminum nitride, boron nitride, alumina, magnesium oxide, calcium oxide, any other suitable material, or combinations thereof. and may, optionally, include any other ceramic particles as described herein.

In some embodiments, the microstructures 432 may include metal oxides, metal nitrides, metal fluorides, rare earth elements, and metal carbides such as, but not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide ("silica"), chromium oxides, iron oxide, boron carbide, boron silicide, copper chromium oxide, titanium dioxide, aluminum nitride, boron nitride, alumina, $HfO_2$, and combinations thereof. Certain fillers, including for example, boron oxide, zinc oxide, cerium oxide, silicon dioxide, and titanium dioxide can act as an emissivity agent to improve the radiation of heat from the coating.

The outer coating 430 also includes nanoporosities 434 (e.g., nanovoids, or nanoholes) having a size in a range of about 30 nm to about 700 nm, inclusive (e.g., 30, 40, 50, 60, 70, 80, 90, 100, 120, 140, 160, 180, 200, 25, 300, 350, 400, 450, 500, 550, 600, 650, or 700 nm, inclusive), which are configured to cause the outer coating 430 to have the solar absorptivity in the range of less than 0.5 (e.g., less than 0.5, 0.4, 0.3, 0.2, or 0.1, inclusive). The tailored microstructures 434 may maximize refractivity for the wavelength of interest, i.e., about 0.5 micron or nearby wavelength in solar absorptivity.

In some embodiments, the coating 430 may include additional components such as, for example, one or more fillers (e.g., microstructures), solvents, defoamers, emulsifiers, thickeners, UV and light stabilizers, dyes, or resins, as described in detail with respect to the outer coating 130, 230, or 330.

In some embodiments, one or more binders may be included in the coating 430, for example, in a range of about 10% to about 70%, inclusive, by weight of the total dry composition of the outer coating 130 (e.g., about 10% to about 20%, about 20% about 30%, about 30% to about 40%, about 40% to about 50%, about 50% to about 60%, about 60% to about 70%, inclusive). The binder may include any binder as described with respect to the coating 130, 230, 330. In some embodiments, one or more reflective additives, stabilizers, dyes, colorants, pigments may be included in the coating 430.

Figure 5:
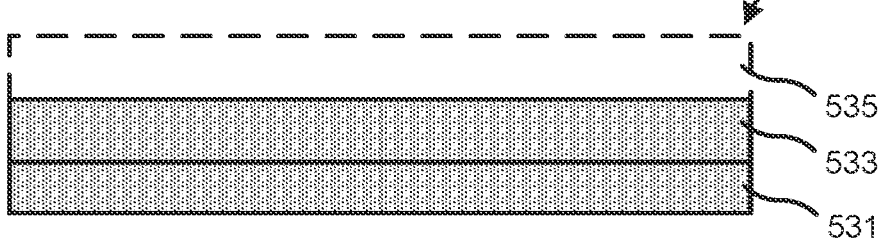
FIG. 5 is a schematic illustration of a multilayer coating that has low solar absorptivity and high radiative emissivity for coating on a conductor, and may optionally, include an additional layer having high erosion resistance, according to an embodiment.

FIG. 5 is a schematic illustration of a multilayer coating 530 that has low solar absorptivity and high radiative emissivity for coating a conductor (e.g., the conductor 100, 200, 300), according to an embodiment. The outer coating 530 may include a first layer 531 formulated to be disposed on an outer surface of a conductor layer (e.g., the conductor layer 120, 220, 320) and a second layer 533 disposed on the first layer 531. The first layer 531 may have the radiative emissivity of greater than 0.5 at a wavelength in a range of 2.5 microns to 15 microns, inclusive, at an operating temperature in a range of 60 degrees Celsius to 250 degrees Celsius, (e.g., a radiative emissivity of greater than 0.75 at a wavelength of about 6 microns at an operating temperature of about 200 degrees Celsius) thus facilitating heat radiation from the conductor (e.g., the conductor 100, 200, 300). Moreover, the second layer 533 may have the solar absorptivity of less than 0.5 at a wavelength of less than 2.5 microns at an operating temperature in a range of 60 degrees Celsius to 250 degrees Celsius, (e.g., a solar absorptivity of less than 0.3 at a wavelength of less than 2.5 microns at an operating temperature of about 200 degrees Celsius), thus reflecting a substantial amount of solar radiation on the second layer back into the environment.

In some embodiments, the first layer 531 of the outer coating 530 may include microstructures (e.g., any of the microstructures described herein with respect to the outer coating 130, 230, 330, 430) configured to cause the first layer 531 to have the high radiative emissivity, a described herein. Moreover, the second layer 533 may include nanoporosities (e.g., as described with respect to the outer coating 130, 230, 330, 430) configured to cause the second layer 533 to have the low solar absorptivity, as described herein. Each of the first layer 531 and the second layer 533 may be formed from any suitable materials as described herein (e.g., PVDF-HFP, PTFE, TEFLON®, any other coating including any additives, binders, surfactants, etc. as described herein). In some embodiments, the second layer 533 may be similar in structure to the inner coating 116, 416 with the difference that the second layer 533 is formulated or tuned to have solar absorptivity of less than 0.5 at a wavelength of less than 2.5.

In some embodiments, one or both of the first layer 531 and the second layer 533 may be formulated to also have an erosion resistance that is at least 5% greater than the erosion resistance of aluminum or aluminum alloys (e.g., have a Vicker hardness of greater than about 175 MPa as described in detail with respect to the outer coating 130, 230). For example, the first layer 531 and/or the second layer 533 may include ceramics (e.g., any of the ceramics as described with respect to the outer coating 130, 230). In some embodiments, the outer coating 530 may be a trilayer coating, i.e., include optionally include a third layer 535 disposed on the second layer 533 as shown in FIG. 5. The third layer 535 may have an erosion resistance that is at least 5% greater than the erosion resistance of aluminum or aluminum alloys, and may have a Vickers hardness of greater than about 175 MPa (e.g., as described in detail with respect to the outer coating 130, 230). In some embodiments, the third layer 535 may be the outer most layer of the outer coating 530. In some embodiments, the third layer 535 may be the inner most layer of the outer coating 530. In some embodiments, the third layer 535 may be disposed between the first layer 531 and the second layer 533.

Figure 6A:
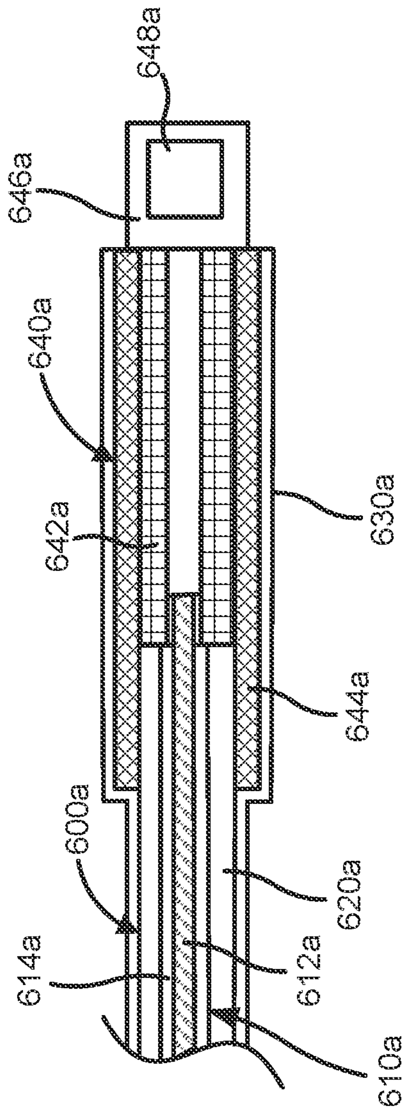
FIG. 6A is a side cross-section view of a coupler crimped to an axial end of a strength member of a conductor, and coated with a coating that has low solar absorptivity and high radiative emissivity, and optionally, high erosion resistance, high corrosion resistance, according to an embodiment.

FIG. 6A is a side cross-section view of a coupler or a fitting 640*a* crimped to an axial end of a conductor 600*a* and being coated with a coating 630*a* that has low solar absorptivity and high radiative emissivity, according to an embodiment. In some embodiments, the coupler 640*a* may include a dead-end coupler that is configured to couple an axial end of a conductor 600*a* to a tension tower or pole. The conductor 600*a* includes a strength member 610*a* including a core 612*a* and an encapsulation layer 614*a*, and a conductor layer 620*a* disposed around the strength member 610*a*. The strength member 610*a* and the conductor layer 620*a* may be substantially similar to the strength member 110 or 210, and the conductor layer 120 or 220, and therefore not described in further detail herein.

The conductor layer 620*a* of the conductor 600*a* may also be coated with the coating 630*a*. A portion of the coating 630*a* disposed on an axial end of the conductor layer 620*a* that is inserted into the coupler 640*a* may be removed from the conductor layer 620*a* before coupling the coupler 640*a* to the conductor 600*a*. For example, the coating 630*a* disposed on the conductor layer 620*a* may be electrically insulative and it may be desirable for the current passing through the conductor layer 620*a* to also pass through the coupler 640*a*. Removing the electrically insulative coating form the corresponding axial end of the conductor layer 620*a* can allow an inner surface of the coupler 640*a* to directly contact the conductor layer 620*a* when the conductor 600*a* is couple to the coupler 640*a*, thereby enabling electrical communication between the conductor layer 620*a* and the coupler 640*a*. The portion of the outer coating 630*a* disposed on the axial end of the conductor layer 620*a* may be removed using any suitable means including, but not limited to physical removal (e.g., using brushes, peelers, grinders, sand paper, etc.), or chemical removal (e.g., via solvents such as acetone, alcohols, acids, etc.).

The coupler or fitting 640*a* includes a body 642*a* (e.g., a cylindrical body) and defining an internal volume configured to receive a portion of an axial end of the strength member 610*a* conductor 600*a*. For example, a predetermined length of the conductor layer 620*a* of the conductor 600*a* may be removed (e.g., a portion having a length in a range of about 150 mm to about 350 mm, inclusive, from the axial end of the conductor 600*a*). The cross-sectional width of the inner volume of the body 642*a* is less than the outer cross-sectional width of the strength member 610*a*, such that insertion of the axial end of the strength member 610*a* into the body 642*a* causes the inserted portion of the encapsulation layer 612*a* to be crimped. A sleeve 644*a* may be disposed around the body 642*a* (e.g., circumferentially around the body 642*a*) and configured to contact the conductor layer 620*a* so as to electrically couple the coupler 640*a* to the conductor layer 620*a*. The coupler 640*a* may also include a connecting portion 646*a* defining a keyhole 648*a*. The connecting portion 646*a* may be configured to be coupled to corresponding hooks or connectors located on poles (e.g., tension towers) from which the conductor 630*a* may be suspended.

As previously described, the composite material from which the core 612*a* is formed may be susceptible to crush force damage. However, the encapsulation layer 614*a* disposed around the core 612*a* also serves as a protection layer to protect the core 612*a* from the compressing force exerted during crimping of the body 642*a* around the strength member 610*a*. This advantageously allows conventional crimp fittings or couplers to be used with the conductor 600*a*, providing installation ease and flexibility, and reducing cost. While FIG. 6A depicts a particular configuration of a fitting or coupler 640*a*, it should be appreciated that any crimp coupler can be used with the conductor 600*a* or any other conductor described herein, including those for coupling one conductor to another.

The conductor 600*a* is coated with a coating 630*a*. Moreover, the coating 630*a* is also coated on at least a portion of the fitting or coupler 640*a*. The coating 630*a* may be formulated to have at least one of a solar absorptivity of less than 0.5 (e.g., 0.49, 0.45, 0.40, 0.35, 0.30, 0.25, 0.20, 0.15, 0.1, inclusive or even lower) at a wavelength of less than 2.5 microns, or a radiative emissivity of greater than 0.5 (e.g., 0.51, 0.55, 0.60, 0.65, 0.70, 0.75, 0.80, 0.85, 0.90, 0.95, inclusive, or even higher) at a wavelength in a range of 2.5 microns to 15 microns, inclusive at an operating temperature in a range of 60 degrees Celsius to 250 degrees Celsius, inclusive. For example, the coating 630*a* may be formulated to have a radiative emissivity of equal to or greater than 0.75 (e.g., 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, inclusive, or even higher) at a wavelength of about 6 microns, and/or a solar absorptivity of less than 0.3 (e.g., 0.29, 0.28, 0.27, 0.26, 0.25, 0.24, 0.23, 0.22, 0.21, 0.20, 0.15, 0.10, inclusive, or even lower) at a wavelength of less than 2.5 microns at an operating temperature of about 200 degrees Celsius. In some embodiments, the outer coating 630*a* may cause a reduction in operating temperature of the conductor 630*a* as well as the fitting or coupler at a particular current in a range of about 5 degrees Celsius to about 40 degrees Celsius, inclusive (e.g., 5, 6, 7, 8, 9, 10, 12, 14, 16, 18, 20, 25, 30, 35, or 40 degrees Celsius, inclusive), as described herein. The coating 630*a* may include the outer coating 130, 230, 330, 430, 530 or any other coating described herein. In some embodiments, the coupler 640*a* may be precoated with the coating 630*a* before coupling with the conductor 600*a*. In other embodiments, the coupler 640*a* may be coated with the coating 630*a* after the coupler 640*a* is coupled to the conductor 630*a*, for example, to form a continuous coating from the conductor 630*a* to the coupler 640*a*.

Figure 6B:
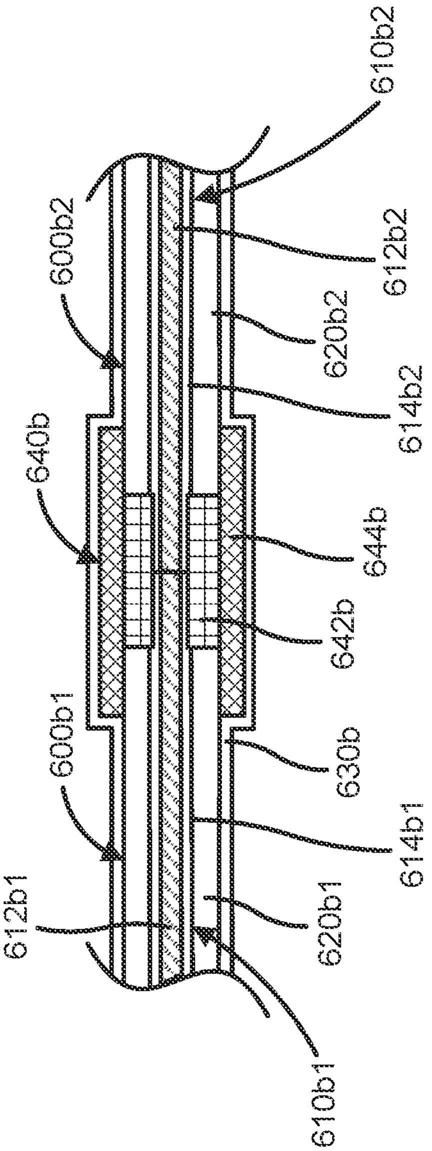
FIG. 6B is a side cross-section view of a coupler crimped to axial ends of strength members of two conductors to splice together the two conductors, and coated with a coating that has low solar absorptivity and high radiative emissivity, and optionally, high erosion resistance, according to an embodiment.

FIG. 6B is a schematic illustration of another fitting or coupler 640*b* that may be used to splice a first conductor 600*b*1 to a second conductor 600*b*2, and coated with a low solar absorptivity and high radiative emissivity coating 630*b*, according to an embodiment. The first conductor 600*b*1 includes a first strength member 610*b*1 including a first core 612*b*1 and a first encapsulation layer 614*b*1, and a first conductor layer 620*b*1 disposed around the first strength member 610*b*1. Similarly, the second conductor 600*b*2 includes a second strength member 610*b*2 including a second core 612*b*2 and a second encapsulation layer 614*b*2, and a second conductor layer 620*b*1 disposed around the second strength member 610*b*1. The conductors 600*b*1 and 600*b*2 may be substantially similar to the conductor 600*a*, and therefore not described in further detail herein. Each of the first conductor layer 620*b*1 and the second conductor layer 620*b*2 may also be coated with the coating 630*a*. A portion of the coating 630*a* disposed on respective axial end of the conductor layers 620*b*1 and 620*b*2 that are inserted into the coupler 640*b* may be removed from the conductor layers 620*b*1 and 620*b*2 before coupling the coupler 640*b* to the conductors 600*a* and 600*b*, similar to the coupling of the conductor 600*a* to the coupler 640*a* as described in detail with respect to FIG. 6A.

The coupler or fitting 640*b* includes a body 642*b* (e.g., a cylindrical body) defining an internal volume configured to receive portions of corresponding axial ends of the first strength member 610*b*1 and the second strength member 600*b*2. For example, a predetermined length of the conductor layers **620*b*1/b2 of the conductors 600*b*1/b2 may be removed (e.g., a portion having a length in a range of about 150 mm to about 350 mm, inclusive from the axial end of the conductors 600*b*1/b2). The cross-sectional width of the inner volume of the body 642*b* is less than the outer cross-sectional width of the strength members 610*b*1/b2, such that insertion of the axial end of the first strength member 610*b*1 and the second strength member 610*b*2 into the body 642*b* causes the inserted portion of the encapsulation layers 612*b*1/b2 to be crimped and spliced to one another. A sleeve 644*b* may be disposed around the body 642*b* (e.g., circumferentially around the body 642*b*) and configured to contact the conductor layers 620*b*1/b2 so as to electrically couple the coupler 640*b* to the conductor layers 620*b*1**/b2.

As previously described, the composite material from which the core **612*b*1/b2 is formed may be susceptible to crush force damage. However, the encapsulation layer 614*b*1/b2 disposed around the core 612*b*1/b2 also serves as a protection layer to protect the core 612*b*1/b2 from the compressing force exerted during crimping of the body 642*b*1/b2 around the strength member 610*b*1**/b2.

The conductors **600*b*1/b2 are coated with a coating 630*b*. Moreover, the coating 630*b*1/b2 is also coated on at least a portion of the fitting or coupler 640*b*1/b2. The coating 630*b* may be formulated to have at least one of a solar absorptivity of less than 0.5 (e.g., 0.49, 0.45, 0.40, 0.35, 0.30, 0.25, 0.20, 0.15, 0.1, inclusive or even lower) at a wavelength of less than 2.5 microns, or a radiative emissivity of greater than 0.5 (e.g., 0.51, 0.55, 0.60, 0.65, 0.70, 0.75, 0.80, 0.85, 0.90, 0.95, inclusive, or even higher) at a wavelength in a range of 2.5 microns to 15 microns, inclusive at an operating temperature in a range of 60 degrees Celsius to 250 degrees Celsius, inclusive. The coating 630*b* may be substantially similar to the coating 630*a* and therefore, not described in further detail herein. In some embodiments, the coupler 640*b* may be precoated with the coating 630*b* before coupling with the conductors 600*b*1 and 600*b*2. In other embodiments, the coupler 640*b* may be coated with the coating 630*b* after the coupler 640*b* is coupled to the conductors 600*b*1 and 600*b*2, for example, to form a continuous coating from the conductors 630*b*1 and 600*b*2 to the coupler 640*b***.

Figure 7:
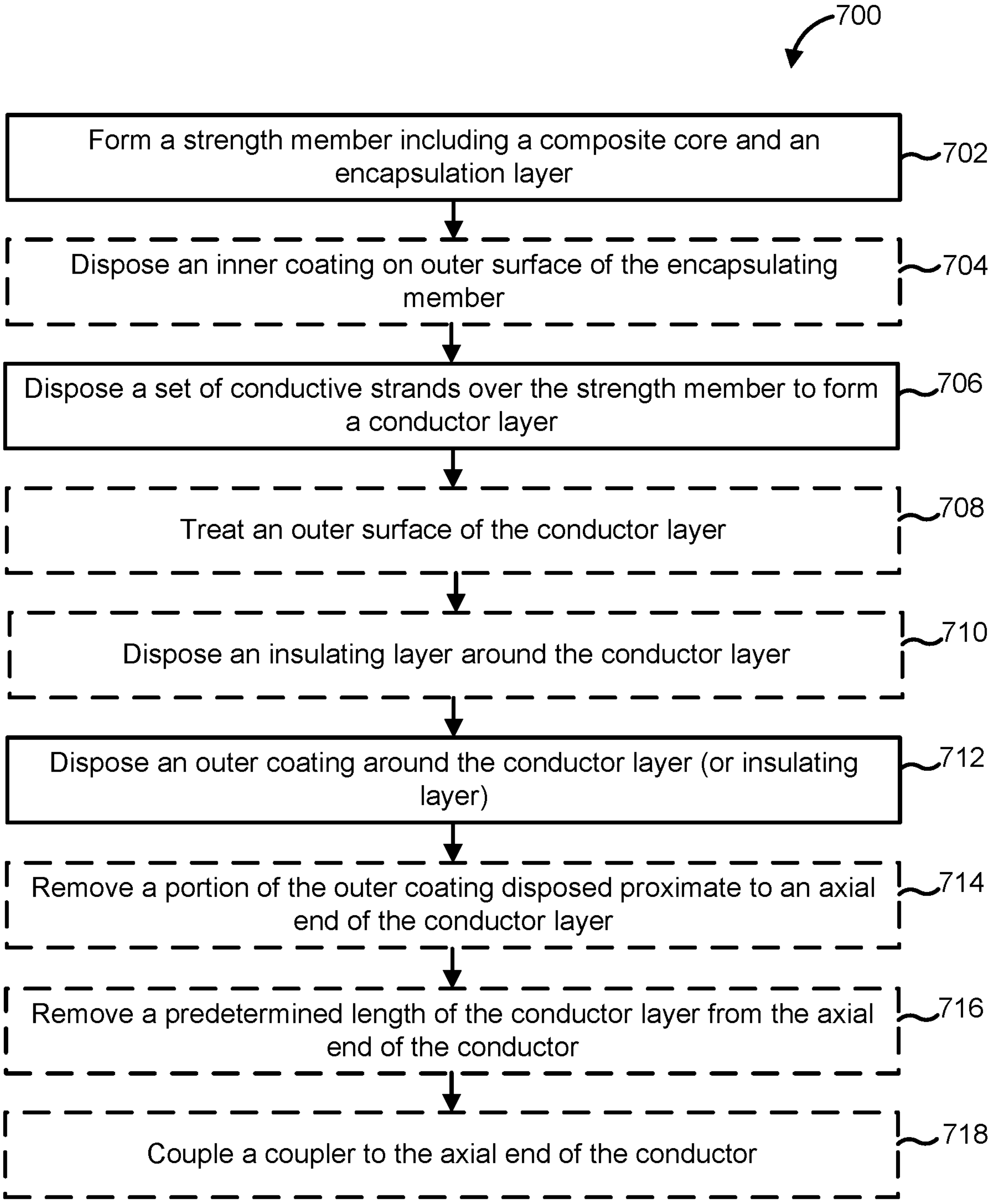
FIG. 7 is a schematic flow chart of a method for fabricating a conductor that includes a strength member and a conductor layer, and reducing solar absorptivity and increasing radiative emissivity of the conductor by disposing a coating having low solar absorptivity, high radiative emissivity, and optionally, high erosion resistance, on the conductor according to an embodiment.

FIG. 7 is a schematic flow chart of a method 700 for reducing solar absorptivity and increasing radiative emissivity of a conductor (e.g., the conductor 100, 200, 300, 600) that includes a strength member (e.g., the strength member 110, 210, 310, 610) and a conductor layer (e.g., the conductor layer 120, 220, 320, 620) by disposing a coating (e.g., the outer coating 130, 230, 330, or 630) having low solar absorptivity and high radiative emissivity on the conductor layer of the conductor, according to an embodiment. While described with respect to the conductor 100, it should be appreciated that the method can be used to form any composite conductor coated with an outer coating, as described herein.

The method 700 includes forming the strength member 110, at 702. The strength member 110 that includes the core 112 formed of a composite material, and the encapsulation layer 114, as previously described herein. The core 112 may include any suitable composite material and may be formed using any suitable method as described with respect to the conductor 100. The encapsulation layer 114 may be formed from Al, Cu, or any other suitable described herein. Moreover, the encapsulation layer 114 may be disposed around the core 112 using a conforming machine or any other suitable method, as described with respect to the conductor 100.

In some embodiments, the inner coating 116 may be disposed on an outer surface of the encapsulation layer 114, at 704, for example, via painting spray coating, depositing and cross-linking, shrink wrapping, any other suitable method, or combination thereof. The inner coating 116 may be formulated to have a low absorptivity of less than 0.5 at a wavelength in a range of 2.5 microns to 15 microns, inclusive, at an operating temperature in a range of 60 degrees C. to 250 degrees Celsius, inclusive, and may be formed from any suitable material, as described herein.

At 706, a set of conductive strands are disposed over the strength member 110 (e.g., around the encapsulation layer 114 or around the inner coating 116 disposed around the encapsulation layer 114) to form the conductor layer 120. The conductive strands may be formed from aluminum, aluminum alloy, copper or copper alloy including micro alloy as conductive media, etc. In some embodiments, the conductor layer 120 may include conductive strands including Z, C, or S wires to keep the outer strands in place. The conductor layer 120 may have any suitable cross-sectional shape, for example, circular, triangular, trapezoidal, etc. In some embodiments, the conductor layer 120 may include stranded aluminum layer may be aluminum round or trapezoidal strands. In some embodiments, the conductor layer 120 may include Z shaped aluminum strands. In some embodiments, the conductor layer 120 may include S shaped aluminum strands.

The conductive strands may be disposed around strength member 110 using a conforming machine or any suitable method, as described herein. In some embodiments, the conductor layer 120 may include a first set of conductive strands disposed around the strength member 110 in a first wound direction (e.g., wound helically around the strength member 110 in a first rotational direction), a second set of conductive strands disposed around the first set of strands in a second wound direction (e.g., wound helically around the first set of conducive strands in a second rotational direction opposite the first rotational direction), and may also include a third set of strands wound around the second set of strands in the first wound direction.

In some embodiments, an outer surface of the conductor layer 120 (e.g., an outer surface of each conductive strand, or a radially outer surface of only the outer most conductive strands included in the conductor layer 120) is treated, at 708. In some embodiments, an insulating layer 122 is disposed around the conductor layer 120, at 710.

For example, the outer surface of the conductive strands of the conductor layer 120 may be cleaned using any suitable method such as, for example, via acid, solvents, and/or texturized using mechanical means (e.g., sand blasted) to facilitate adhesion of the outer coating 130 to the outer surface of the conductor layer 120. In some embodiments in which the insulating layer 122 is disposed around the conductor layer 120, the outer surface of the insulating layer 122 may be cleaned or texturized (e.g., via sand blasting).

At 712, the outer coating 130 is disposed around the conductor layer 120, or around the insulating layer 122 in embodiments in which the insulating layer 122 is disposed around the conductor layer 120. The outer coating 130 may be disposed using any suitable method, for example, via painting spray coating, depositing and cross-linking, shrink wrapping, any other suitable method, or combination thereof. The outer coating 130 may be formulated to have a solar absorptivity of less than 0.5 (e.g., 0.49, 0.45, 0.40, 0.35, 0.30, 0.25, 0.20, 0.15, 0.1, inclusive or even lower) at a wavelength of less than 2.5 microns, and a radiative emissivity of greater than 0.5 (e.g., 0.51, 0.55, 0.60, 0.65, 0.70, 0.75, 0.80, 0.85, 0.90, 0.95, inclusive, or even higher) at a wavelength in a range of 2.5 microns to 15 microns, inclusive at an operating temperature in a range of 60 degrees C. to 250 degrees Celsius, inclusive. For example, the outer coating 130 may be formulated to have a radiative emissivity of equal to or greater than 0.75 (e.g., 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, inclusive, or even higher) at a wavelength of about 6 microns, and a solar absorptivity of less than 0.3 (e.g., 0.29, 0.28, 0.27, 0.26, 0.25, 0.24, 0.23, 0.22, 0.21, 0.20, 0.15, 0.10, inclusive, or even lower) at a wavelength of less than 2.5 microns at an operating temperature of about 200 degrees Celsius. In some embodiments, the outer coating 130 may be configured to cause a reduction in operating temperature of the conductor 100 at a particular current in a range of about 5 degrees Celsius to about 40 degrees Celsius, inclusive (e.g., 5, 6, 7, 8, 9, 10, 12, 14, 16, 18, 20, 25, 30, 35, or 40 degrees Celsius, inclusive), as described herein. The outer coating 130 may include microstructures and nanoporosities, and may be formed from any suitable material, as described herein. In some embodiments, the outer coating 130 may additionally, or alternatively be formulated to have an erosion resistance that is at least 5% greater than an erosion resistance of aluminum or aluminum alloys (e.g., an erosion resistance that is at least about 100% greater than the erosion resistance of aluminum or aluminum alloys.). In some embodiments, the outer coating 130 may have a Vicker hardness of greater than 175 MPa.

In some embodiments, the method 700 may also include removing a portion of the coating 130 (e.g., an outer coating) disposed proximate to an axial end of the conductor 100, at 714. The portion of the outer coating 130 may be removed using any suitable physical or chemical means, as described herein with respect to FIGS. 6A and 6B. The method 700 may also include, removing a predetermined length of the conductor layer 120 from an axial end of the conductor 100 (e.g., via peeling back or cutting the conductor layer 120), at 716 so as to expose the strength member 110 disposed underneath the conductor layer 120, as described with respect to FIGS. 6A and 6B. The method 700 may also include coupling a coupler (e.g., the coupler 640*b* or 640*b*) to the axial end of the conductor 100, at 718, for example, by crimping the coupler to the axial end of the strength member 110, as previously described with respect to FIGS. 6A and 6B.

EXAMPLES

The impact of low solar absorptivity and high radiative emissivity coatings described herein on operating temperature and ampacity of the conductors described herein were simulated and results from the simulations are detailed in the following examples. It should be appreciated that these examples are only for illustrative purposes and should not be construed as limiting the disclosure.

A coating having a solar absorptivity of less than 0.2 and a radiative emissivity of greater than 0.9 was disposed on outer surfaces of various conductors and their impact on operating temperature analyzed. The results are shown in Table 1, where the symbol "TS" recited in the conductor type refers to a conductor according to the present disclosure (e.g., the conductor 100, 200, 300, 600).

TABLE 1

Operating temperature of various conductors with and without low solar absorptivity and high radiative emissivity coating.

| Conductor Type | Temperature Without Coating (° C.) | Temperature With Coating (° C.) |
|---|---|---|
| ACSR Linnet (0.72" conductor OD) | 90 | 77 |
| TS Linnet (0.72" conductor OD) | 75 | 65 |
| TS Linnet (0.72" conductor OD) | 90 | 78 |
| TS Linnet (0.72" conductor OD) | 200 | 163 |
| ACSR Bluebird (1.76" conductor OD) | 90 | 74 |
| TS Linnet (1.76" conductor OD) | 78 | 65 |
| TS Linnet (1.76" conductor OD) | 90 | 74 |
| TS Linnet (1.76" conductor OD) | 200 | 156 |

As shown in Table 1, depositing the coating having the low solar absorptivity and high radiative emissivity on the outer surface of the TS conductors causes a reduction in operating temperature of the conductor of at least 10 degrees Celsius with the reduction in operating temperature being greater than 30 degrees Celsius. Thus, the TS conductors can be run cooler while allowing the same current to be delivered through the TS conductors, or allows a higher current to be delivered through the TS conductors at the same operating temperature.

Performance of various TS conductors operating under ambient conditions of 30 degrees Celsius, 2 ft/sec wind speed at a 90 degrees angle to the conductor, and an elevation of 900 feet was simulated using various ACSR conductors as models to determine the increase in ampacity or reduction in operating current using the outer coating as described herein. The results are summarized in Table 2.

TABLE 2

Impact of low solar absorptivity and high radiative emissivity coating on ampacity and operating temperature of various TS conductors.

| No coating | Coating SA/RE = 0.5/0.5 | Coating SA/RE = 0.2/0.9 | Coating SA/RE = 0.5/0.9 | Coating SA/RE = 0.2/0.5 |
|---|---|---|---|---|
| TS Bluebird 1.76 inch outer diameter conductor | | | | |
| A/OT = 1,842A/90° C. | 2,081A/90° C. | 2,438A/90° C. | 2,326A/90° C. | 2,206/90° C. |
| (ACSR Bluebird) | 2,081A/90° C. | 2,081A/74° C. | 2,081A/79° C. | 2,081A/83° C. |
| | 3,473A/200° C. | 4,021A/200° C. | 3,971A/200° C. | 3,529A/200° C. |
| | 3,473A/200° C. | 3,473A/156° C. | 3,473A/160° C. | 3,473A/194° C. |

TABLE 2-continued

Impact of low solar absorptivity and high radiative emissivity coating on ampacity and operating temperature of various TS conductors.

| No coating | Coating SA/RE = 0.5/0.5 | Coating SA/RE = 0.2/0.9 | Coating SA/RE = 0.5/0.9 | Coating SA/RE = 0.2/0.5 |
|---|---|---|---|---|
| | 3,065A/160° C. | 3,531A/160° C. | 3,468A/160° C. | 3,136A/160° C. |
| | 3,065A/160° C. | 3,065A/127° C. | 3,065A/132° C. | 3,065A/153° C. |
| TS Rail 1.165 inch outer diameter conductor | | | | |
| A/OT = 1,095A/90° C. (ACSR Rail) | 1,234A/90° C. | 1,412A/90° C. | 1,355A/90° C. | 1,295A/90° C. |
| | 1,234A/90° C. | 1,234A/76° C. | 1,234A/80° C. | 1,234A/84° C. |
| | 2,015A/200° C. | 2,294A/200° C. | 2,269A/200° C. | 2,044A/200° C. |
| | 2,105A/200° C. | 2,015A/159° C. | 2,015A/163° C. | 2,015A/194° C. |
| | 1,789A/160° C. | 2,024A/160° C. | 1,992A/160° C. | 1,824A/160° C. |
| | 1,789A/160° C. | 1,789A/129° C. | 1,789A/134° C. | 1,789A/154° C. |
| ACSR 1.165 inch outer diameter conductor | | | | |
| A/OT/ = 1,070/90° C. at 3000 ft elevation and wind (ACSR Rail) | 1,205A/90° C. | 1,391A/90° C. | 1,329A/90° C. | 1,272A/90° C. |
| | 1,985A/200° C. | 2,269A/200° C. | 2,242/200° C. | 2,015A/200° C. |
| A/OT/ = 1,2929/90° C. and 4 ft/sec wind (ACSR Rail) | 1,455A/90° C. | 1,609A/90° C. | 1,559A/90° C. | 1,508A/90° C. |
| | 2,300A/200° C. | 2,548A/200° C. | 2,525A/200° C. | 2,325A/200° C. |

A = ampacity;
OT = Operating temperature;
SA = solar absorptivity;
RE = radiative Emissivity.

As observed in Table 2, the highest reduction in operating temperature, or increase in ampacity is observed with an outer coating having solar absorptivity of 0.2 and radiative emissivity of 0.9. Under higher wind condition (4'/s vs. 2'/s), the effect of higher emissivity (225 A vs. 254 A improvement @200° C.; 104 A vs 121 A improvement @90° C.) may be less dominant as convection heat loss becomes more significant. The effect of reduced solar absorptivity (25 A vs. 29 A @200° C.; 53 A vs. 61 A @90° C.) may also be less critical as well, and the absorptivity minimization is more important at lower temperature operation as radiative cooling at lower temperature is not as dominant (radiation loss is proportional to the fourth power of temperature).

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially' and similar terms are intended to have a broad meaning in harmony with the common and accepted usage by those of ordinary skill in the art to which the subject matter of this disclosure pertains. For example, the term "substantially flat" would mean that there may be de minimis amount of surface variations or undulations present due to manufacturing variations present on an otherwise flat surface. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms "coupled," and the like as used herein mean the joining of two members directly or indirectly to one another. Such joining may be stationary (e.g., permanent) or moveable (e.g., removable, or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus, comprising:
a strength member, including:
a core having a glass transition temperature or melting temperature and
an encapsulation layer disposed around the core;
a conductor layer disposed around the strength member; and
an outer layer disposed on the conductor layer, the outer layer having a solar absorptivity of less than 0.5 at a wavelength of less than 2.5 microns, and a radiative emissivity of greater than 0.5 at a wavelength in a range of 2.5 microns to 15 microns, at an operating temperature in a range of 60 degrees Celsius to 250 degrees Celsius such that the outer layer is configured to maintain the core of the strength member below its glass transition temperature or melting temperature.

2. The apparatus of claim 1, wherein the coating is formulated to have a radiative emissivity of equal to or greater than 0.75 at a wavelength of about 6 microns, and a solar absorptivity of less than 0.3 at a wavelength of less than 2.5 microns at an operating temperature of about 200 degrees Celsius.

3. The apparatus of claim 1, wherein the coating includes:
microstructures having a size in a range of 3 microns to 15 microns, the microstructures configured to cause the coating to have the radiative emissivity of greater than 0.5; and
nanoporosities having a size in a range of 50 nm to 700 nm, the nanostructures configured to cause the coating to have the solar absorptivity in the range of less than 0.5.

4. The apparatus of claim 3, wherein the coating includes a fluoropolymer and/or polyurethane.

5. The apparatus of claim 3, wherein the microstructures include at least one of metal oxides, metal nitrides, metal fluorides, metal carbides, metal carbonates, or rare earth elements.

6. The apparatus of claim 5, wherein the microstructures include a carbonate.

7. The apparatus of claim 1, wherein the coating includes:
a first layer disposed on the conductor layer, the first layer having the radiative emissivity of greater than 0.5; and
a second layer disposed over the first layer, the second layer having the solar absorptivity of less than 0.5.

8. The apparatus of claim 1, wherein the apparatus further includes:
an inner coating disposed between the encapsulation layer and the conductor layer, the inner coating formulated to have a heat absorptivity of less than 0.5 at a wavelength in a range of 2.5 microns to 15 microns, at an operating temperature in a range of 60 degrees Celsius to 250 degrees Celsius.

9. The apparatus of claim 1, wherein the conductor layer includes a plurality of conductive strands disposed around the strength member.

10. The apparatus of any one of claim 1, wherein the coating is formulated to have an erosion resistance that is at least 5% greater than an erosion resistance of aluminum or aluminum alloys.

11. The apparatus of any one of claim 1, wherein the coating is hydrophilic.

12. An apparatus, comprising:
a strength member, including:
a core having a glass transition temperature or melting temperature and
an encapsulation layer disposed around the core, an outer surface of the encapsulation layer having a radiative absorptivity of less than 0.6 at a wavelength in a range of 2.5 microns to 15 microns corresponding to an operating temperature of greater than 90 degrees Celsius;
a conductor layer disposed around the strength member and configured to transmit electrical signals therethrough,
wherein the reflectivity of the outer surface is configured to cause a temperature of the core to be maintained below its glass transition temperature or melting temperature.

13. The apparatus of claim 12, wherein the outer surface of the encapsulation layer is treated so as to have the reflectivity of greater than 50%.

14. The apparatus of claim 12, wherein the outer surface is coated with a coating having the reflectivity of greater than 50%.

15. The apparatus of claim 12, wherein a coating is disposed on the conductor layer, the coating formulated to have a solar absorptivity of less than 0.5 at a wavelength of less than 2.5 microns, and a radiative emissivity of greater than 0.5 at a wavelength in a range of 2.5 microns to 15 microns, at an operating temperature in a range of 60 degrees Celsius to 250 degrees Celsius.

16. The apparatus of claim 15, wherein the coating is formulated to have a radiative emissivity of equal to or greater than 0.75 at a wavelength of about 6 microns, and a solar absorptivity of less than 0.3 at a wavelength of less than 2.5 microns at an operating temperature of about 200 degrees Celsius.

17. The apparatus of claim 15, wherein the coating includes:
microstructures having a size in a range of 3 microns to 15 microns, the microstructures configured to cause the coating to have the radiative emissivity of greater than 0.5; and
nanoporosities having a size in a range of 50 nm to 700 nm, the nanostructures configured to cause the coating to have the solar absorptivity in the range of less than 0.5.

18. The apparatus of claim 17, wherein the coating includes a fluoropolymer and/or polyurethane.

19. The apparatus of claim 17, wherein the microstructures include at least one of metal oxides, metal nitrides, metal fluorides, metal carbides, metal carbonates, or rare earth elements.

20. The apparatus of claim 19, wherein the microstructures include a carbonate.

21. The apparatus of claim 12, wherein the coating has an erosion resistance that is at least about 100% greater than the erosion resistance of aluminum or aluminum alloys.

22. The apparatus of claim 12, wherein the coating has a Vicker hardness of greater than 175 MPa.

23. An assembly, comprising:
a conductor, including:
a strength member, including:
a core formed having a glass transition temperature or melting temperature and
an encapsulation layer disposed around the core;
a conductor layer disposed around the strength member;
a coupler coupled to an axial and of the conductor; and
a coating disposed on an outer surface of the coupler, the coating formulated to have at least one of a solar absorptivity of less than 0.5 at a wavelength of less than 2.5 microns or a radiative emissivity of greater than 0.5 at a wavelength in a range of 2.5 microns to 15 microns, at an operating temperature in a range of 60 degrees Celsius to 250 degrees Celsius such that the coating is configured to maintain the core of the strength member below its glass transition temperature or melting temperature.

24. The assembly of claim 23, wherein the coating is a first coating, the assembly further comprising:
a second coating disposed on at least a portion of an outer surface of the conductor layer of the conductor, the coating formulated to have at least one of a solar absorptivity of less than 0.5 at a wavelength of less than 2.5 microns or a radiative emissivity of greater than 0.5 at a wavelength in a range of 2.5 microns to 15 microns, at an operating temperature in a range of 60 degrees Celsius to 250 degrees Celsius.

25. The assembly of claim 24, wherein the second coating is disposed on a portion of the conductor layer that is disposed axially outwards of the coupler.

26. The assembly of any one of claim 23, wherein the coupler is crimped to the axial end of the conductor.

27. The assembly of claim 26, wherein a predetermined length of the conductor layer at the axial end of the conductor is removed before coupling the coupler to the conductor such that coupler is crimped to the strength member.

* * * * *